US005199639A

United States Patent [19]

Kobayashi et al.

[11] Patent Number: 5,199,639

[45] Date of Patent: Apr. 6, 1993

[54] SHOWER WITH A MICROMOTOR OPERATED REVOLVING SHOWER HEAD

[75] Inventors: Hiroshi Kobayashi; Masahito Hitotsumatsu; Ryosuke Hayashi; Mikio Horimoto; Yasuhide Kimura, all of Fukuoka, Japan

[73] Assignee: Toto, Ltd., Fukuoka, Japan

[21] Appl. No.: 833,427

[22] Filed: Feb. 10, 1992

[30] Foreign Application Priority Data

| | | | |
|---|---|---|---|
| Feb. 12, 1991 | [JP] | Japan | 3-19082 |
| Feb. 21, 1991 | [JP] | Japan | 3-27275 |
| Mar. 6, 1991 | [JP] | Japan | 3-39877 |
| Apr. 16, 1991 | [JP] | Japan | 3-84228 |

[51] Int. Cl.[5] .......... F16K 25/00; F16J 15/40

[52] U.S. Cl. .......... 239/11; 239/282; 239/394; 239/436; 4/570; 4/601; 4/615

[58] Field of Search .......... 239/1, 11, 71–73, 239/273, 282, 283, 390–392, 394, 436, 442, 525; 4/541.6, 615, 601, 567, 568, 570

[56] References Cited

U.S. PATENT DOCUMENTS

| | | | |
|---|---|---|---|
| 1,968,391 | 7/1934 | Hamilton | 239/394 |
| 2,132,333 | 10/1938 | Wendell et al. | 239/394 |
| 3,830,432 | 8/1974 | Grohe | 239/394 |
| 4,719,654 | 1/1988 | Blessing | 239/282 |
| 4,756,030 | 7/1988 | Juliver | 4/570 |

FOREIGN PATENT DOCUMENTS

| | | |
|---|---|---|
| 3931657 | 10/1990 | Fed. Rep. of Germany . |
| 55-6044 | 1/1980 | Japan . |
| 3020184 | 1/1991 | Japan . |
| 3-122164 | 12/1991 | Japan . |

*Primary Examiner*—Andres Kashnikow
*Assistant Examiner*—Karen B. Merritt
*Attorney, Agent, or Firm*—Lowe, Price, LeBlanc & Becker

[57] ABSTRACT

A hand-held shower unit (12; 250; 504; 540) is disclosed which comprises a rotatable shower head (94) provided with a plurality of spray heads (132; 134; 136; 138) having different spray or water delivery characteristics. The rotatable head (94) is mounted on a shaft (122) driven by a micromotor (190) received in an inner cavity (64) which is formed in a handle casing (52; 252) by offsetting a water conduit (58). Upon pressing a control button (200), the rotatable head (94) is rotated such that water is delivered through selected one of the spray heads (132; 134; 136; 138). To establish a fluid tight seal between the rotary head (94) and the water conduit (58) while avoiding frictional contact therebetween in order to reduce the torque required for the micromotor (190) to rotate the head (94), a water pressure-responsive movable sealing member (104; 260) is arranged. Also disclosed is a shower bath system (10; 500) including in combination the hand-held shower unit (12; 250; 504; 540). An automatic faucet is also disclosed which is capable of automatically varying the water delivery patterns. Various other embodiments and method of use are also disclosed.

63 Claims, 31 Drawing Sheets

FIG. 28

| SPRAY PATTERN | FLOW COEFFICIENT (CVM) | PRESSURE SENSOR OUTPUT VOLTAGE | | |
|---|---|---|---|---|
| | | MINIMUM (VML) | DESIRED (VM) | MAXIMUM (VMH) |
| NORMAL | CVA | VAL | VA | VAH |
| NON-RESTRICTED | CVB | VBL | VB | VBH |
| AERATED | CVC | VCL | VC | VCH |
| CONVERGED | CVD | VDL | VD | VDH |

SHOWER WITH A MICROMOTOR OPERATED REVOLVING SHOWER HEAD

BACKGROUND OF THE INVENTION

1. Field of the Invention

The present invention relates to water delivery appliances such as hand-held or fixed showers for shower baths and wash basins as well as faucets for domestic sinks and bath tubs. More particularly, the present invention relates to water delivery appliances of the class mentioned having a micromotor-operated rotatable shower or water delivery head capable of delivering water in selected one of different discharge modes or patterns.

2. Description of the Prior Art

In applications of shower baths and wash basins, it has been customary to use a variety of shower head configurations depending on the intended purposes. For example, it is often desirable that water be delivered in the form of an aerated antisplash spray when women's hairs are to be rinsed at wash basins and shower baths, whereas a normal diverging spray pattern is preferable for washing human bodies in shower bath facilities. Also, shower heads adapted to deliver pulsated or converged water jet have been used to provide massaging effect.

Similarly, various faucet spout designs have been developed for use with domestic sinks and bath tubs to provide a variety of water delivery modes or patterns. A faucet fitting designed for anti-splash aerated flow is desirable when dishes and the like are washed and rinsed. In certain occasions, such as filling the wash basin or bath tub as quickly as possible, a non-restricted laminar flow is convenient to supply water at a higher flow rate.

Typically, the conventional way of changing the spray pattern of shower bath installations is to disconnect the existing hand-held shower from a shower hose and replace it with another one having different spray characteristics. This is costly because provision for a plurality of different showers is necessitated. In addition, storage and replacement of various showers are cumbersome.

Hand-held showers and faucets having a dual spray or water delivery head have been known in the art. For example, Japanese Utility Model Application No. 2-29669/1990 discloses a faucet fitting for residential sinks having two water outlets located in a side-by-side relationship and having different water delivery patterns. A diverter valve operated by a manual knob is provided to selectively communicate water source with either of the two outlets. While this dual outlet arrangement offsets requirement for the storage and replacement of different fittings, manual operation of the diverter valve is still cumbersome and time consuming, because the knob must be rotated for a number of turns.

U.S. Pat. No. 3,830,432 and Japanese Utility Model Kokai Publication No. 55-6044/1980 disclose a hand-held shower having a shower head mounted rotatably on a water supply pipe. The rotatable shower head is provided with a plurality of sprayer heads having distinct jet properties. The arrangement is such that, by turning the rotatable shower head, one of the sprayer heads is selectively communicated with the water supply pipe.

While the rotatable shower head structure described above advantageously provides a diversity of spray properties without replacing the shower head, one of the disadvantages is that change-over of spray properties can often be carried out only with difficulties. For example, the shower head is often wetted by soap and shampoo so that the surface thereof is often quite slippery. Therefore, a relatively large gripping force must be exerted by the user's hands in order to successfully rotate the shower head. Another inconvenience is that the change-over cannot be carried out by a single hand. That is, in order to change the spray properties, the user must first hold the water supply pipe by one hand and then grip the rotatable shower head by the other hand to cause it rotated. Such procedures necessitating manipulation by both hands are often cumbersome because, in the first place, use of shower must be interrupted at least for several seconds. In the second place, prior to manipulation the user must first put a sponge or brush aside if it is in use.

SUMMARY OF THE INVENTION

Accordingly, an object of the present invention is to provide an improved water delivery appliance, including hand-held or fixed shower and faucet, which is adapted to provide a variety of water delivery characteristics.

Another object of the invention is to provide a shower or faucet which is capable of providing a variety of water delivery characteristics and wherein water delivery characteristics are readily changed-over.

A still another object of the invention is to provide a hand-held shower which is capable of changing-over water delivery characteristics by a single-hand manual operation of the user.

A further object of the invention is to provide a shower or faucet which is capable of providing a variety of water delivery characteristics and which is capable of changing-over water delivery characteristics almost instantaneously in response to the user's command.

Another object of the invention is to provide a shower or faucet having a revolving shower or water delivery head which is designed to deliver water in a variety of different delivery patterns and which is rotated by a compact micromotor housed in the shower or faucet.

Another object of the invention is to provide a shower or faucet having a micromotor-operated rotatable water delivery head which is switched over in response to the user simply pressing on a push-button.

When a compact electric motor is used to rotate the revolving water delivery head, it is important that the head is rotated as smoothly as possible in order to reduce torque imposed upon the motor and to shorten the time required for change-over of spray properties. Otherwise, a large-sized electric motor having a large output would be required, so that use of a micromotor would become prohibitive. On the other hand, it is also important that an adequate fluid seal is established across the fluid path between the rotatable head and the casing in order to avoid loss of water. To improve the fluid tightness of seal between the rotatable head and the casing would require that the head be tightly engaged with the casing. This results in an increase in the frictional contact therebetween and, thus, entails use of a high power motor.

Accordingly, a further object of the invention is to provide a shower or faucet having a micromotor-operated revolving shower or water delivery head and having such an arrangement that permits reduction in friction between the rotatable head and the casing during rotation of the head while establishing an fluid tight seal therebetween when water is to be delivered.

Another object of the invention is to provide a shower or faucet having a rotatable water delivery head which is driven by a battery-operated micromotor.

The present invention is also directed to provide a method of use of the shower or faucet having a rotatable water delivery head.

According to the invention, there is provided a hand-held shower unit comprising a tubular handle casing having a water conduit therethrough. The water conduit is offset at least in part with respect to the longitudinal axis of the casing in such a manner that a central inner cavity is formed in the handle casing adjacent an end thereof at which the water conduit terminates in a water outlet port and at which a rotatable shaft is coaxially mounted. An electric drive, preferably including a geared micromotor having a conventional reduction gear mechanism and controlled by an electronic control triggered by a push-button switch, is received in the inner cavity of the casing and is coupled to an end of the shaft. A rotatable shower head is mounted to the other end of the shaft for rotation therewith. The rotatable shower head is provided with a plurality of different spray heads which are angularly equally spaced apart from each other and which have distinct and different spray characteristics. Each of the spray heads has a water inlet which faces the end face of the casing and which is offset relative to the longitudinal axis of the casing similar to the water outlet port of the casing. Each of the spray heads also has an outwardly directed spray outlet in fluid communication with the water inlet.

Upon pressing on the push-button switch, the electronic control signals the micromotor to rotate the rotatable shower head through a predetermined angle so that one of the spray heads is selectively aligned with the water conduit, whereby water under pressure admitted into the water conduit is delivered through the selected spray head. The rotatable shower head may be rotated in sequence until a spray head having a desired spray characteristics is selected.

In this manner, with the hand-held shower unit according to the invention, spray characteristics may readily be changed over only by a single hand since it is sufficient to simply press on the push-button switch for rotation of the shower head. Therefore, change-over of spray characteristics can be performed quickly without interrupting shower operation for a substantial time interval. Pressing of the button may readily be performed even by elderly or handicapped people since neither gripping nor rotational force is needed.

The offset arrangement of the water conduit is particularly advantageous in that a central cavity having a volume large enough to house the micromotor as well as the reduction gear mechanism is formed in the handle casing, while securing at the same time a cross-sectional flow area for the water conduit which is sufficiently large to avoid any substantial pressure loss when water is to be supplied at a high flow rate.

Preferably, a pressure-responsive movable sealing member having a water outlet port facing the rotatable shower head is slidably received in a bore formed in the handle casing. The sealing member is designed to move in the bore in response to water pressure in the water conduit of the casing and has a pressure receptive area larger than the cross-sectional area of the outlet port.

When the rotatable shower head is to be rotated, the water pressure applied to the water conduit may preliminarily be interrupted or at least reduced. Then, in the absence of water pressure, the sealing member is substantially disengaged from the rotatable shower head so that frictional contact between the sealing member and the rotatable shower head is decreased or eliminated. As a result, the torque required for the micromotor to rotate the shower head is reduced so that the rotatable shower head may be rotated promptly even by a compact micromotor having a limited output power.

When the water pressure is resumed, however, an outwardly directed differential pressure is developed across the sealing member and biases it against the rotatable shower head thereby to establish a fluid tight seal therebetween. In this manner, use of the pressure-responsive sealing member enables reduction of friction which would otherwise be developed between the rotatable shower head and the casing during rotation of the head, while establishing a fluid tight seal whenever water is supplied.

Reduction of water supply pressure when the rotatable shower head is to be rotated may be performed by closing a flow control valve feeding the shower unit. Alternatively, the water pressure may be reduced by draining the water supply toward a conventional faucet associated with the shower system. In either case, a separate electronic control may be used to control water supply to the shower unit.

Preferably, a pressure sensor may be provided to detect water pressure in the water conduit of the shower unit and the electronic control of the shower unit may be programmed such that the micromotor is activated to rotate the shower head when the pressure becomes less than a predetermined level.

The pressure sensor associated with the shower unit is operable to detect pressure variation in the shower unit much sooner than a conventional turbine-driven flowmeter associated with the flow control valve feeding the shower unit does measure the flow rate therethrough, since generally a turbine-driven flowmeter requires a certain time lag due to inertia before the turbine reaches a steady state condition. Therefore, preferably the signals from the pressure sensor may be used to control the flow control valve feeding the shower unit.

In another preferred embodiment of the invention, an arrangement is provided to detect the environmental condition in which the shower unit is placed in use. The rotatable shower head is rotated such that a spray head having a spray characteristics adapted to the detected environment is automatically selected.

According to another aspect, this invention provides a faucet having a rotatable water delivery head and having features described hereinbefore.

These features and advantages of the invention as well as other features and advantages thereof will become apparent when reading the following description in conjunction with the accompanying drawings.

BRIEF DESCRIPTION OF THE DRAWINGS

FIG. 28 illustrates a table of various data which are stored in the memory of the control circuit for the flow control unit and wherein the suffix M represents generally the symbols A-D for the four spray heads;

DESCRIPTION OF THE PREFERRED EMBODIMENTS

The present invention will now be described in more detail with reference to various embodiments thereof shown in the accompanying drawings.

Figure 1:
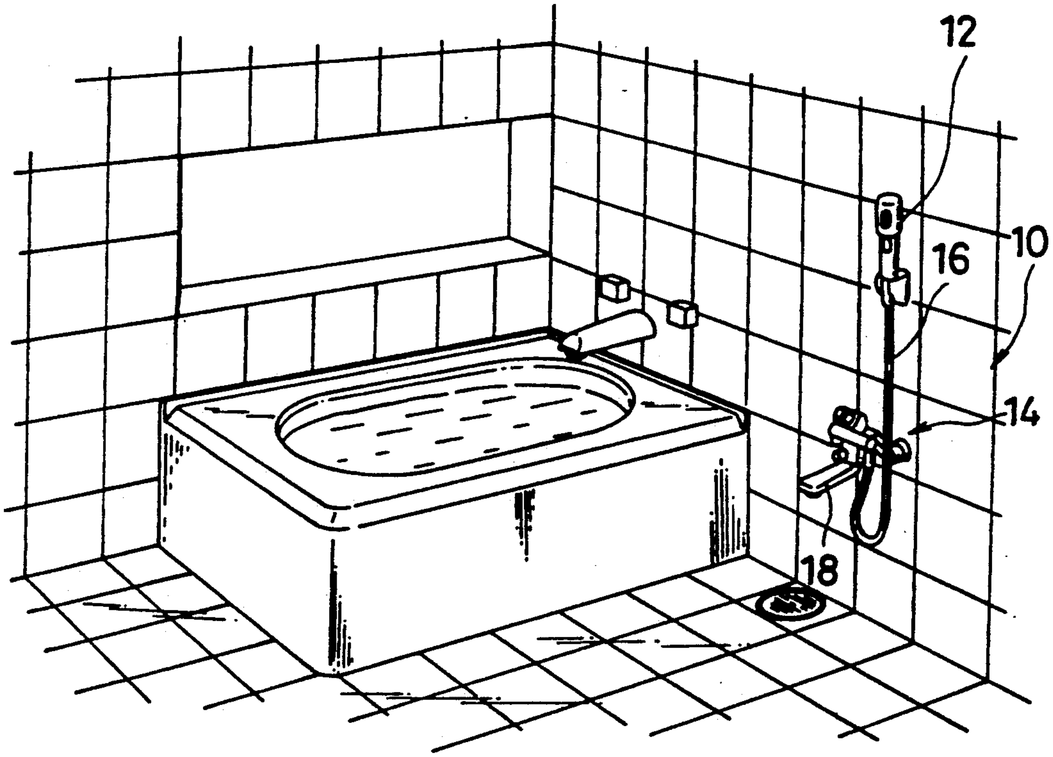
FIG. 1 is a perspective view illustrating a bath room in which is installed a shower bath system incorporating a hand-held shower unit according to the invention.

Referring to FIG. 1, there is shown a bath room equipped with a shower bath system 10 according to the invention. The system 10 includes a hand-held shower unit 12 according to the first embodiment of the invention. The shower unit 12 is connected to an electrically operated flow control unit 14 through a flexible hose 16. The flow control unit 14 is provided with a conventional faucet spout 18 for the floor area.

Figure 2:
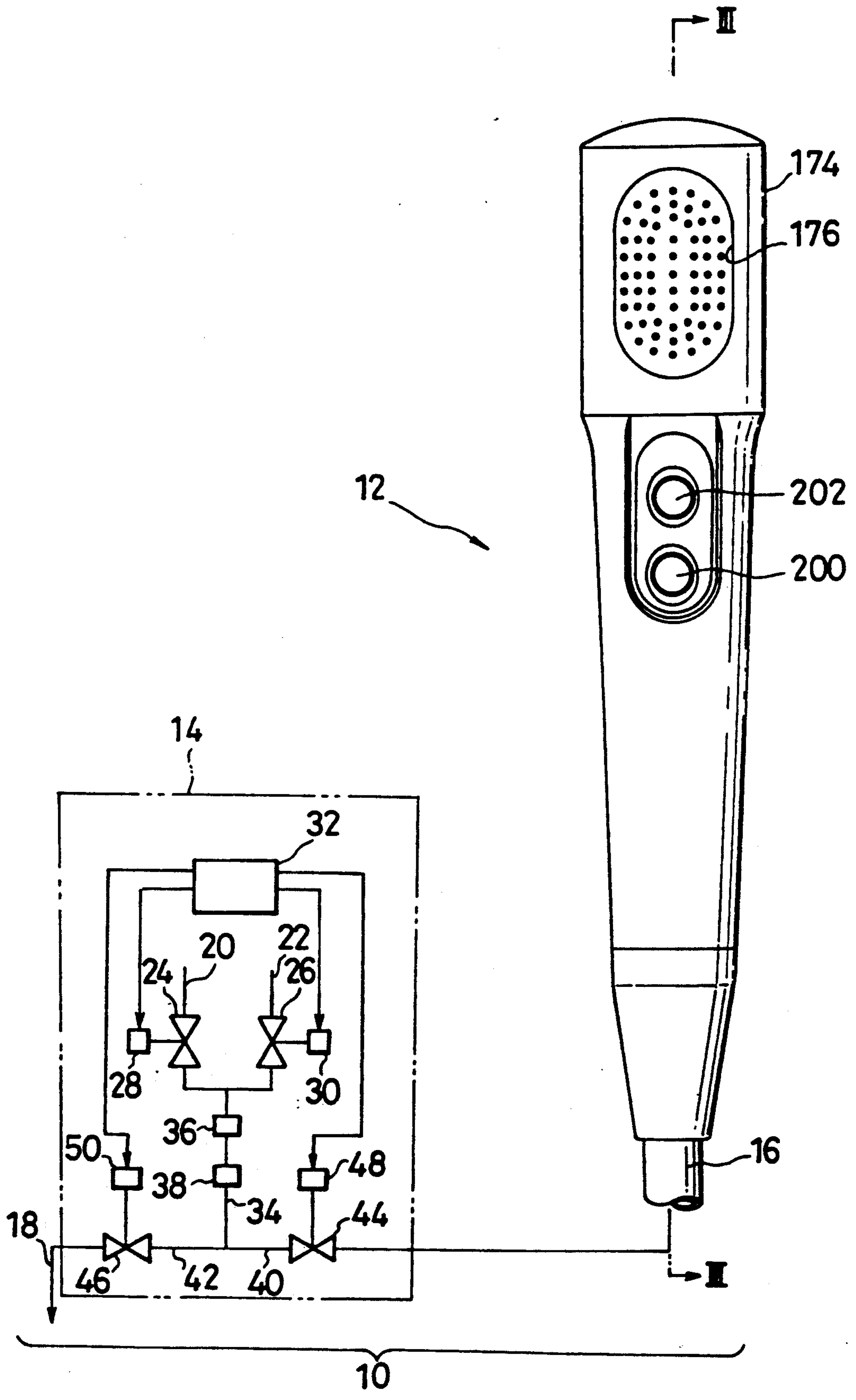
FIG. 2 is a diagrammatic representation of the shower bath system shown in FIG. 1 and illustrating the hand-held shower unit as connected by a flexible shower hose to a flow control unit.

As shown in FIG. 2, the flow control unit 14 includes a cold water inlet 20 connected in the conventional manner to a water supply, not shown, and a hot water inlet 22 connected to a hot water supply, not shown, such as a boiler. Conventional flow control valves 24 and 26 operated, respectively, by electric valve actuators 28 and 30 are disposed across the inlets 20 and 22 to control the flow rate therethrough. Each of the actuators 28 and 30 may be of the conventional type having a stepping motor which is controlled by an electronic control circuit 32. The inlets 20 and 22 are merged into a common pipe 34 so that the valves 24 and 26 operate as mixing valves for the common pipe 34. A conventional thermistor-type temperature sensor 36 and a conventional turbine-driven flowmeter 38 is arranged in the common pipe 34 to detect the temperature and flow rate of mixed water flowing therethrough. The common pipe 34 is bifurcated into a first outlet 40 connected to the shower hose 16 and a second outlet 42 connected to the faucet 18. Conventional shut-off valves 44 and 46 are provided in the outlets 40 and 42, respectively. Obviously, when the valve 44 is opened with the valve 46 closed, the mixed water under pressure will be fed entirely toward the shower unit 12. If the valve 44 is closed with or without the valve 46 closed, the water pressure to the shower unit 12 will be interrupted. When both valves 44 and 46 are opened, the shower hose 16 will be subjected to a substantial pressure drop. These shut-off valves 44 and 46 are operated, respectively, by conventional solenoid actuators 48 and 50 which are controlled by the control circuit 32.

Referring primarily to FIGS. 3–12, the structure and the principle of operation of the hand-held shower unit 12 will be described.

Figure 3:
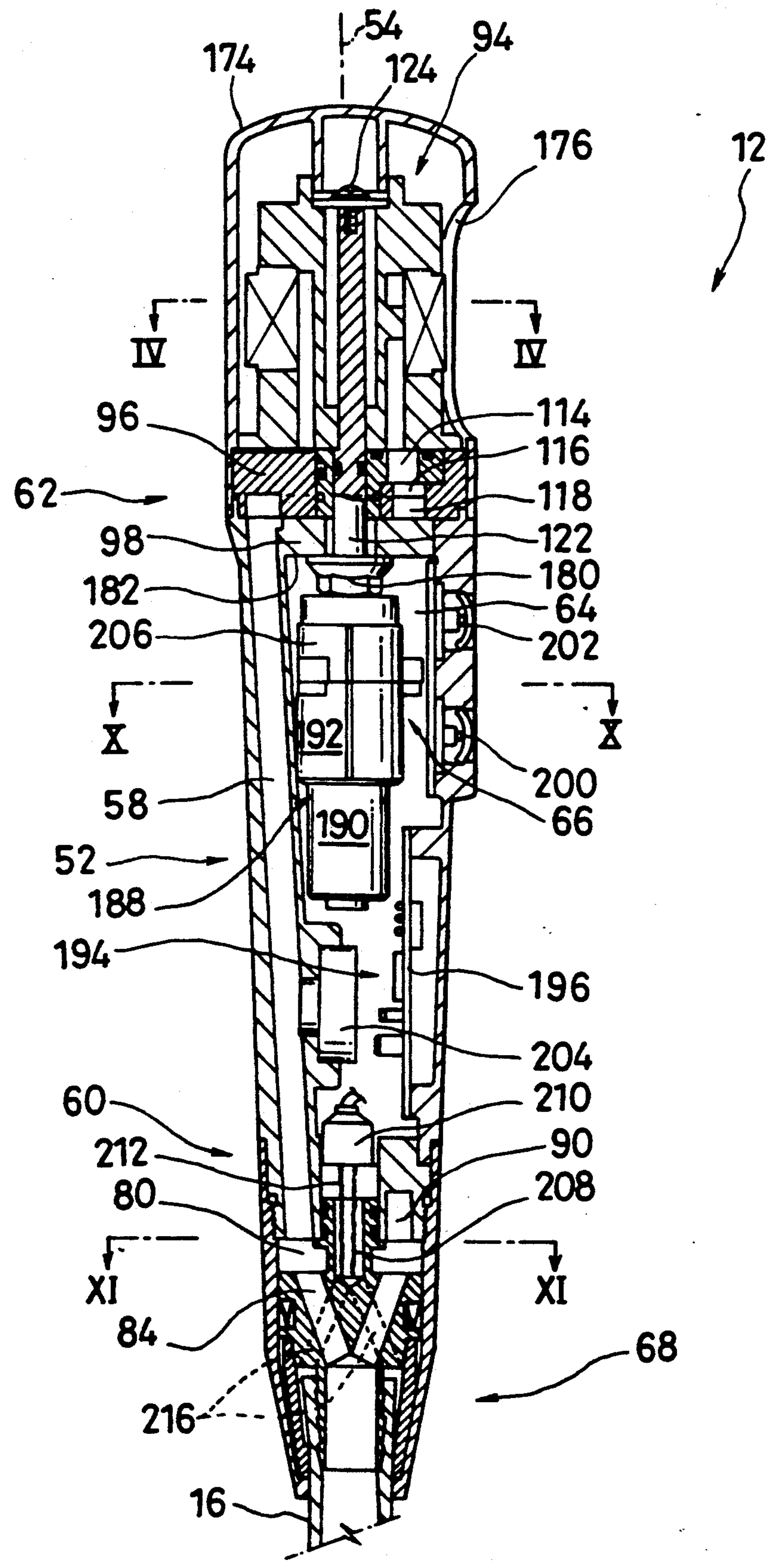
FIG. 3 is a cross-sectional view of the shower unit taken along the line III—III of FIG. 2.
Figure 10:
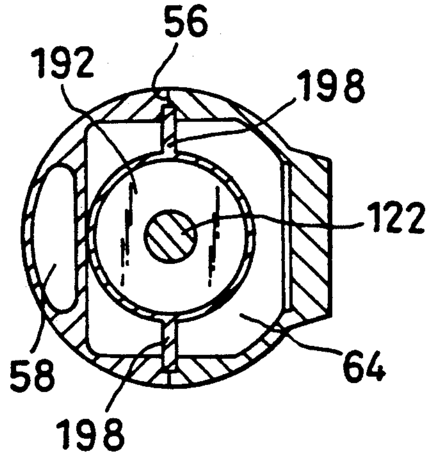
FIG. 10 is a cross-sectional view taken along the line X—X of FIG. 3.
Figure 11:
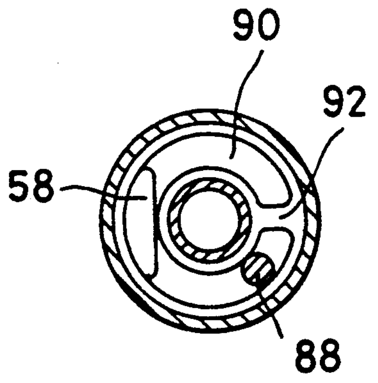
FIG. 11 is a ross-sectional view taken along the line XI—XI of FIG. 3.

As shown in FIG. 3, the hand-held shower unit 12 has a tubular handle casing 52 having a longitudinal axis 54. The casing 52 may be made from suitable plastic material and may be comprised of two split halves joined together along a vertical parting plane 56 is will be readily apparent from FIG. 10. The handle casing 52 has a water conduit 58 extending therethrough from a first or proximal end 60 to a second or distal end 62 of the casing. As best shown in FIGS. 3, 10 and 11, the water conduit 58 is radially outwardly offset from the longitudinal axis 54 of the casing 52 so that a central cavity 64 having a dimension large enough to house an electric drive 66 and various other components is formed in the handle casing 52. As shown in FIGS. 10 and 11, the water conduit 58 has an elongated arcuated cross-section extending circumferentially of the casing 52 to provide a large cross-sectional flow area for the water flow flowing therethrough.

Figure 12:
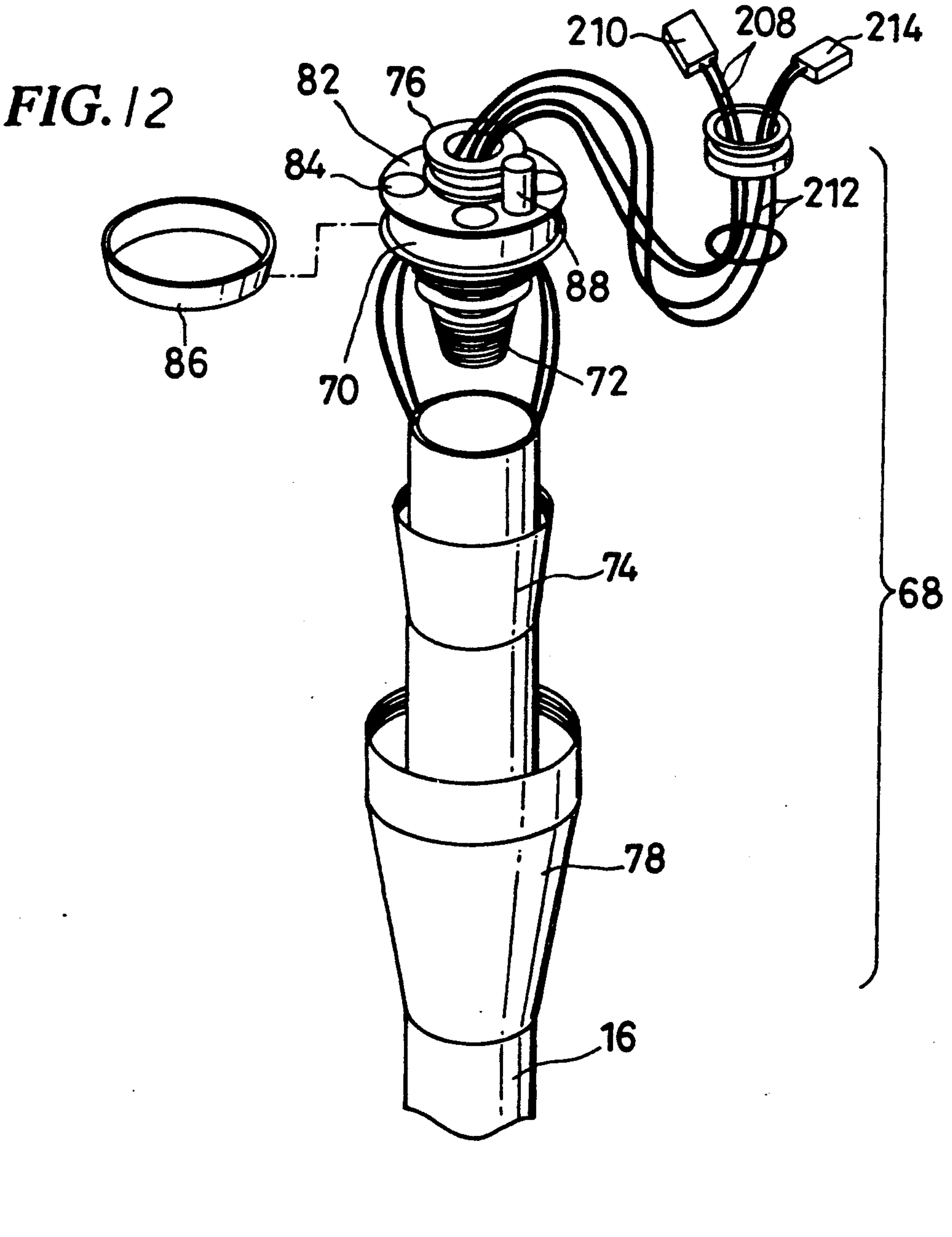
FIG. 12 is an exploded perspective view showing the hose coupling section of the shower unit shown in FIG. 3.

Mixed water fed from the flow control unit 14 via the flexible hose 16 is supplied to the water conduit 58 through a hose coupling assembly 68 which is best shown in FIGS. 3 and 12. The coupling assembly 68 includes a hose joint 70 provided with a serrated tubular section 72 over which an end of the hose 16 is fitted and secured by a collet ring 74. The joint 70 has an upper boss 76 which is fluid tightly and rotatably fitted in an associated bore of the casing 52 by way of suitable sealing means such as 0-rings. The hose joint 70 is held in place by a retainer nut 78 screwed to the casing 52 in such a manner that an annular space 80 is formed between the lower end of the casing 52 and an annular end face 82 of the joint 70. A plurality of passages 84 extend across the joint 70 to communicate the interior of the flexible hose 16 to the annular space 80. Accordingly, water fed by the hose 16 will flow through passages 84 and annular space 80 into the water conduit 58. A Y-packing 86 fitted over the joint 70 establishes a fluid seal while permitting the hose joint 70 to rotate with respect to the retainer nut 78 and to the handle casing 52.

Rotation of the hose joint 70 with respect to the casing 52 is limited by a stop pin 88 projecting from the joint 70 and engaging in an arcuated groove 90 formed on the lower end of the casing 52. As shown in FIG. 11, the groove 90 is discontinued at 92 to form a stop wall against which the stop pin 88 is engageable. With this arrangement, the hand-held shower unit 12 is fluid tightly swivelled to the flexible hose 16 for limited rotational movement having a rotational angle of less than 360°. Such arrangement for limited rotation is particularly advantageous in providing a high degree of freedom of relative rotation for the shower unit 12 with respect to the flexible hose 16, while preventing electric wires connecting the shower unit 12 and the flow control unit 14 from being overly twisted as described later in more detail.

Water under pressure admitted in the water conduit 58 is supplied to a rotatable shower head 94 by way of a friction-free or contact-free sealing arrangement which will now be described.

Figure 6:
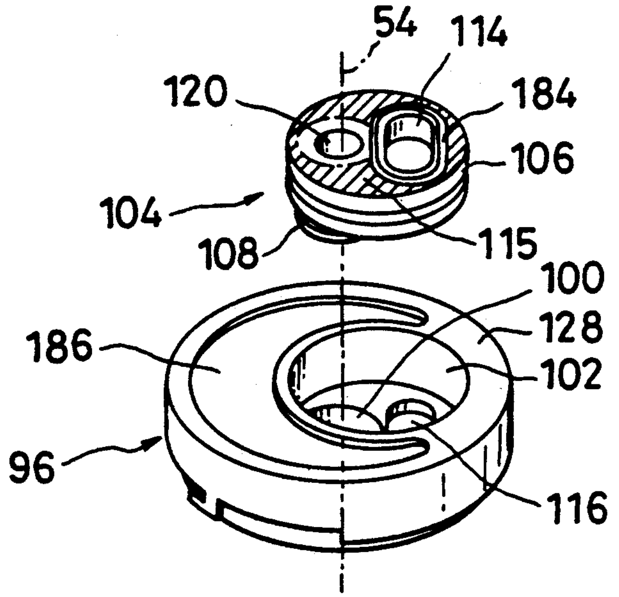
FIG. 6 is an exploded perspective view of a pressure responsive movable sealing member and an associated end plate.
Figure 7:
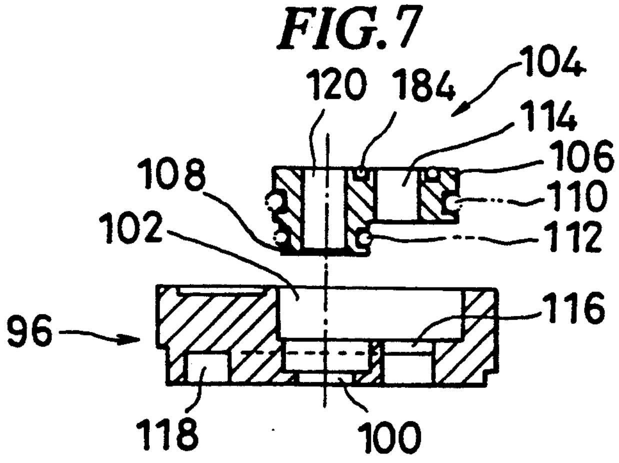
FIG. 7 is an exploded cross-sectional view of the sealing member and end plate shown in FIG. 6.
Figure 8:
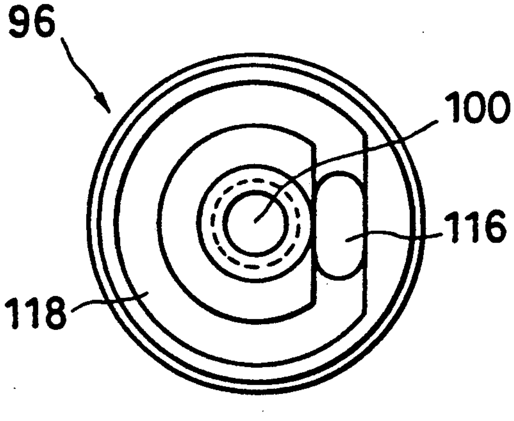
FIG. 8 is a bottom view of the end plate shown in FIGS. 6 and 7.

To facilitate fabrication, in the illustrated embodiment, the second or distal end 62 of the handle casing 52 is comprised of a circular end plate 96 bonded to a radial wall 98. As best shown in FIGS. 6 and 7, the end plate 96 is formed with a stepped axial bore 100 which opens into a larger bore 102 which is offset with respect to the longitudinal axis 54 of the handle casing 52. A pressure responsive movable sealing member 104 is fluid tightly and slidably received in the bores 100 and 102 of the end plate 96. The movable sealing member 104 comprises a disk-shaped upper portion 106 and a cylindrical lower portion 108, with the former engaging in the offset bore 102 and the latter in the axial bore 100. An 0-ring 110 provides a fluid tight seal between the bore 102 and the upper portion 106, while an O-ring 112 serves to seal the lower portion 108 with respect to the bore 100. The upper portion 106 of the movable sealing member 104 has an elongated water outlet port 114 which is offset from the longitudinal axis 54 of the casing 52 and opens into the planar end face 115 of the sealing member 104. The outlet port 114 is in fluid communication with a similarly elongated through opening 116 which is formed in the end plate 96 and which opens into a D-shaped groove 118 which, in turn, is communicated with the water conduit 58. Thus, water will flow from the conduit 58 through the groove 118 and the opening 116 into the water outlet port 114.

Figure 9A:
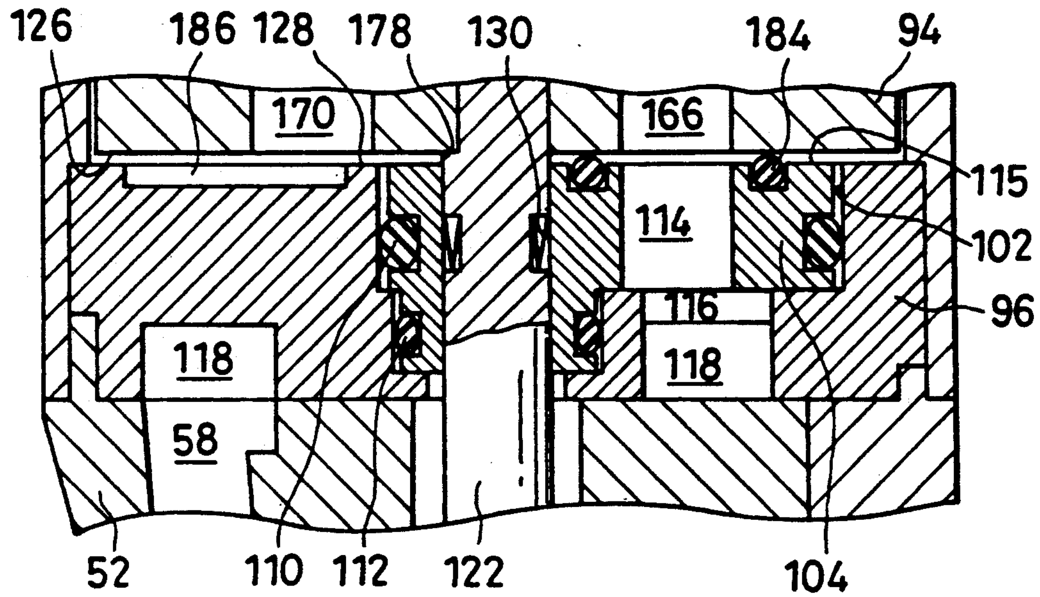
FIGS. 9A and 9B are enlarged cross-sectional views illustrating in some exaggerated manner the operation of the movable sealing member, with FIG. 9A showing the sealing member as being situated in its rest position in the absence of water pressure and with FIG. 9B showing the sealing member as being lifted and urged against the rotatable shower head in response to water pressure.
Figure 9B:
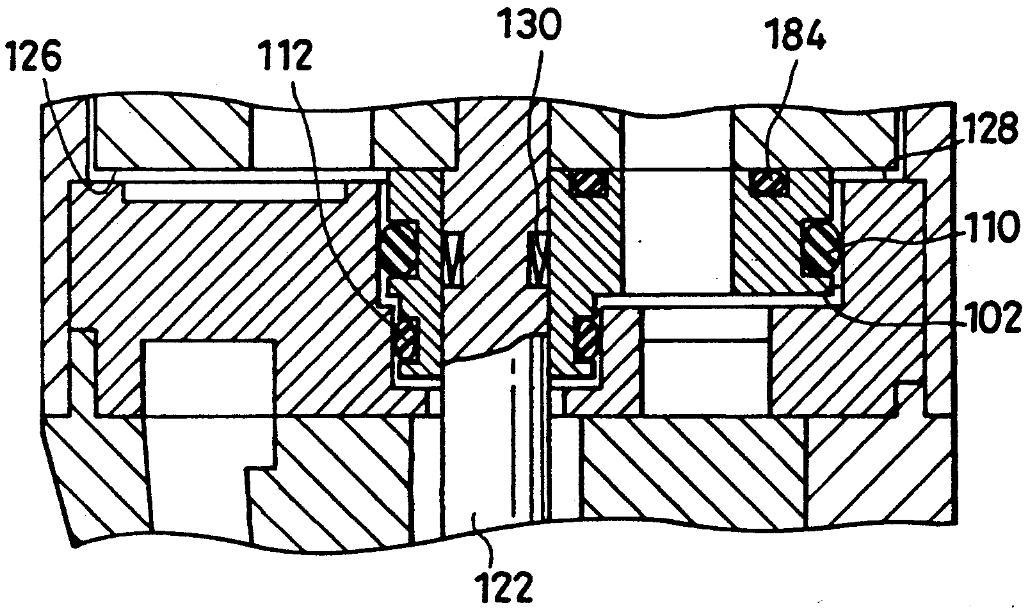

As shown in FIGS. 6 and 7, the movable sealing member 104 is provided with a through bore 120 coaxial with the handle casing 52. A shaft 122 extends through this bore 120 as best shown in FIGS. 3, 9A and 9B. The rotatable shower head 94 is detachably fastened by a screw 124 to the outer end of the shaft 122. The rotatable shower head 94 has a planar end face 126 perpendicular to the longitudinal axis 54 and closely facing the planar end face 115 of the sealing member 104 and the upper end face 128 of the end plate 96. The shaft 122 is rotatably supported by the sealing member 104 which, in turn, is moveably supported by the end plate 96 for limited axial movement. A Y-packing 130 (FIGS. 9A and 9B) is used to seal the shaft 122 against the sealing member 104.

Figure 4:
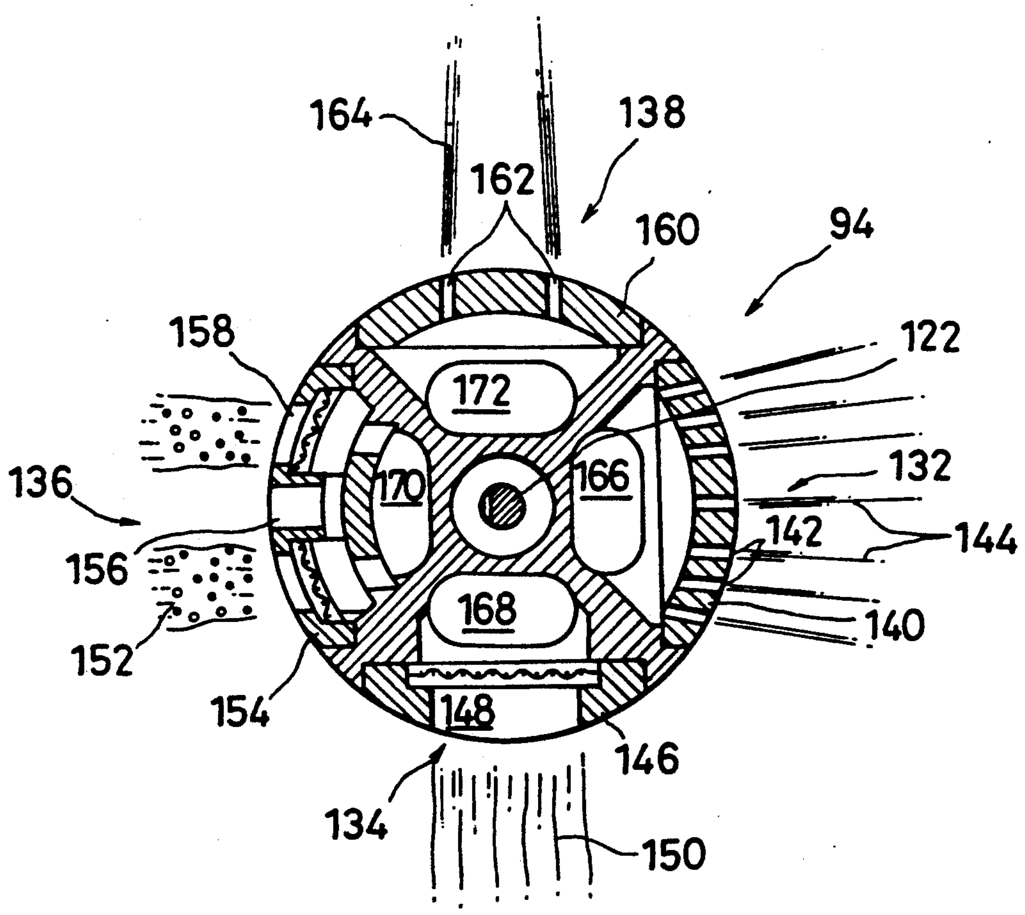
FIG. 4 is a cross-sectional view of the rotatable shower head taken along the line IV—IV of FIG. 3 and schematically showing four different water delivery patterns, with a cap for the shower head being removed for simplicity.
Figure 5A:
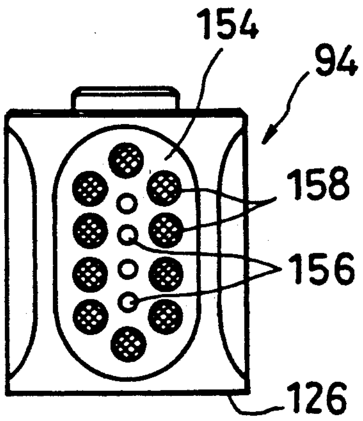
FIGS. 5A through 5D are side elevational views showing different spray heads of the rotatable shower head.
Figure 5B:
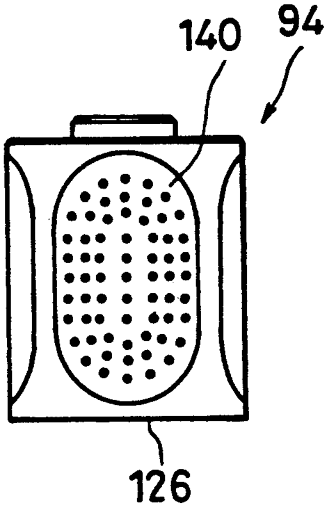
Figure 5C:
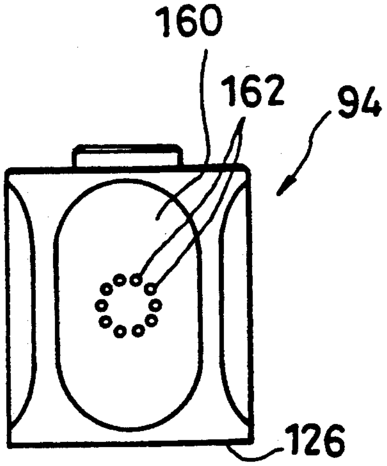
Figure 5D:
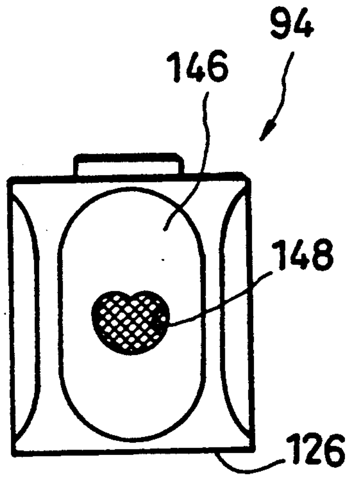

Referring primarily to FIGS. 4 and 5, the rotatable shower head 94 is cylindrical in shape and coaxially aligned with the handle casing 52. In the illustrated embodiment, the rotatable shower head 94 is provided with four spray or water delivery heads 132, 134, 136 and 138 having different spray or water delivery characteristics. For example, the spray head 132 includes an outlet fitting 140 having perforations 142 adapted to spray water in the form of a normal diverging spray 144. The next spray head 134 is provided with an outlet fitting 146 having an enlarged single discharge opening 148 adapted to deliver a non-restricted laminar flow 150. This configuration is advantageous when water is to be delivered at a higher flow rate such as feeding a bath tub or wash basin. The third spray head 136 is designed to form an anti-splash aerated or frothed spray 152 and, to this end, has an outlet fitting 154 provided with air inlets 156 that are merged into venturi-forming discharge openings 158. The fourth spray head 138 is provided with an outlet fitting 160 having a plurality of discharge passages 162 which are converged toward a point to form converged water jets 164 which may be used to provide massaging effect. These outlet fittings 140, 146, 154 and 160 are in fluid communication, respectively, with water inlets 166, 168, 170 and 172 having an oblong cross-section and which are open onto the end face 126 of the shower head 94. As will be best understood from FIGS. 9A and 9B, these inlets 166, 168, 170 and 172 are radially offset from the axis 54 of the handle casing 52 so that, upon rotation of the rotatable shower head 94, they are aligned in sequence with the water outlet port 114 of the movable sealing member 104 to receive water under pressure therefrom. As shown in FIGS. 2 and 3, the rotatable shower head 94 is preferably surrounded by a cap 174 detachably fitted over the handle casing 52 and having a window 176 aligned circumferentially with the outlet port 114.

Referring primarily to FIG. 9A, wherein the clearance between the rotatable shower head 94 and the end plate 96 is shown in some exaggerated manner, the shaft 122 carrying the rotatable shower head 94 is provided with a shoulder 178 formed by a D-cut. The shower head 94 is seated on the shoulder 178 and is held in place by the screw 124 (FIG. 3). As shown in FIG. 3, an adjustable flanged nut 180 is threadingly engaged over the shaft 122 and abuts against the inner surface 182 of the end wall 98. The surface 182 provides a bearing surface for the flanged nut 180 as the shaft 122 is rotated by the electric drive 66. As best shown in FIGS. 6, 9A and 9B, an O-ring 184 is fitted in a groove formed on the end face 115 of the sealing member 104 and surrounding the water outlet port 114. The flanged nut 180 is adjusted in such a manner that the lower end face 126 of the head 94 closely faces the upper end face 115 of the movable sealing member 104, with a small clearance in the order of a fraction of a millimeter being formed therebetween as shown exaggerated in FIG. 9A, and that the lower end face 126 of the rotatable shower head 94 loosely contacts with the O-ring 184.

As described later in detail, the shower unit 12 may be controlled such that the shower head 94 is rotated when the pressure of water in the water conduit 58 is absent or less than a predetermined level. In that condition, the movable sealing member 104 rests upon the end plate 96 as shown in FIG. 9A and, although not shown in FIG. 9A, the rotatable shower head 94 loosely engages the O-ring 184. The weight of the shower head 94 and the shaft 122 as assembled together, as well as the weight of the electric drive 66 suspended therefrom, are supported by the O-ring 184 which is then slightly compressed. However, since the rotatable shower head 94 is free from any frictional contact with the stationary parts of the shower unit 12 other than the O-ring 184, the rotatable shower head 94 can be rotated readily even when the electric drive 66 is comprised of a micromotor having a limited output. To reduce a risk of frictional engagement between the shower head 94 and the end plate 96, the upper face of the plate 96 may be recessed as shown at 186 in FIG. 6.

Referring to FIG. 9B, when water supply is resumed to feed the shower head 94, water pressure is applied in the bore 102 so that a differential pressure is developed across the movable sealing member 104 between the water pressure and the atmospheric pressure. More specifically, the sealing member 104 has, in the bore 102 in which it is fitted, a pressure receptive cross-sectional area which is equal to the cross-sectional area of the O-ring 110 minus the cross-sectional area of the O-ring 184 and minus the cross-sectional area of the O-ring 112. The net cross-sectional pressure receptive area of the sealing member 104 is shown hatched in FIG. 6. Therefore, the movable sealing member 104 is subjected to an upward thrust due to the pressure difference acting on the pressure receptive area. As a result, the sealing member 104 is biased against the rotatable shower head 94 to compress the O-ring 184 as shown in FIG. 9B, thereby establishing a fluid tight seal therebetween. In this manner, the movable sealing member 104 enables to reduce frictional engagement between the rotatable shower head 94 and the casing 52 during rotation of the head 94 but to establish an fluid tight seal therebetween whenever water is being supplied.

Referring again to FIG. 3, the electric drive 66 comprises a conventional geared micromotor 188 having a DC motor 190 and a reduction gear mechanism 192. The final gear, not shown, of the reduction gear mechanism 192 is coupled to the shaft 122 in a well known manner. The micromotor 190 is controlled by an electronic control circuit 194 mounted on a circuit board 196 which is also received in the inner cavity 64 of the handle casing 52 and affixed thereto. The geared micromotor assembly 88 primarily is supported by and suspended from the shaft 122. To prevent the geared motor assembly 188 from rotating relative to the handle casing 52, the housing of the reduction gear mechanism 192 is provided with a pair of radial webs 198 which are sandwiched between the casing halves as shown in FIG. 10. With this arrangement, the geared micromotor assembly 188 may readily be assembled to the shaft 122 with a high degree of alignment, regardless of fabrication tolerances that might exist.

Figure 13:
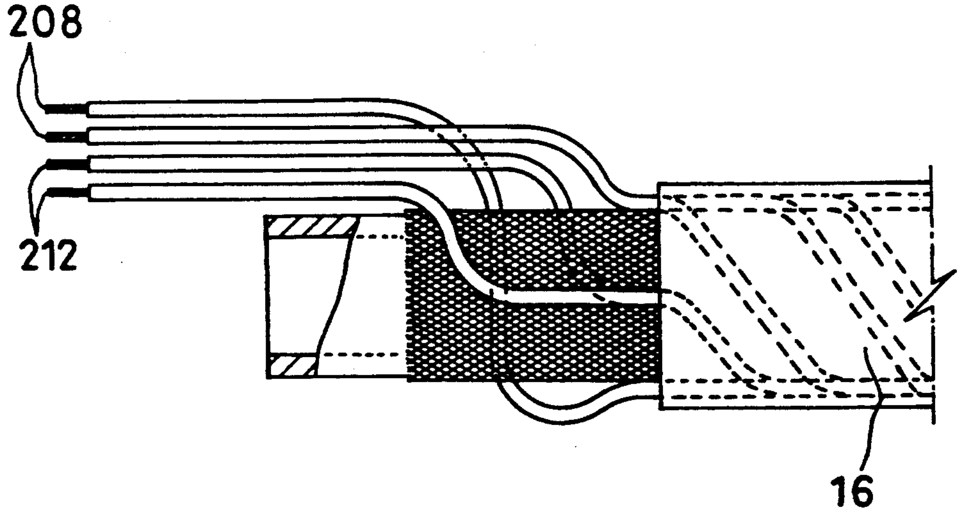
FIG. 13 is a view illustrating the manner in which a pair of electric power supply wires and a pair of electronic communication wires are arranged around the flexible hose.

Referring further to FIG. 3, the shower unit 12 is provided with a pair of conventional push-button-type control switches 200 and 202 which are connected to the control circuit 194 by electric wires, not shown. The upper control switch 202 is intended to control water supply to the shower unit 12 by sending a command to open or close the flow control valves 24 and 26, whereas the lower control switch 200 is used to control the spray or water delivery characteristics by sending a signal to rotate the rotatable shower head 94. A conventional pressure sensor 04 is operatively associated with the water conduit 58 to detect the pressure of water flowing therethrough and its output signal is sent via signal lines, not shown, to the control circuit 194. To detect the angular position of the rotatable shower head 94, the shower unit 12 is further provided with an angular position sensor 206 which is associated with the shaft 122 and which delivers signals to the control circuit 194 via signal lines, not shown. The position sensor 206 will be described later in some detail with reference to FIGS. 14A-14C. In the illustrated embodiment, electric power is supplied from the control circuit 32 of the flow control unit 14 to the control circuit 194 of the shower unit 12 via a pair of supply lines 208 having a connector 210 as shown in FIGS. 3 and 12. The control circuits 32 and 194 preferably comprise programmable digital microcomputers which communicate with each other via a pair of twist wires 212 similarly shown in FIG. 12 and having a connector 214. As shown in FIGS. 12 and 13, the lines 208 and 212 are helically wound around the flexible shower hose 16. The portion of these lines 208 and 212 extending out of the hose 16 extends through a pair of inclined passages 216 formed across the hose joint 70 and opening into a central bore of the boss 76 as shown in FIGS. 3 and 12. Thereafter, the lines 208 and 212 are drawn into the central cavity 64 of the handle casing 52. As the lines 208 and 212 are centered as they enter into the cavity 64 and since relative rotation between the hose joint 70 and the handle casing 52 is limited by the stop pin 88 as described hereinbefore with reference to FIG. 11, the wires 208 and 212 are substantially exempted from tension and stress throughout the swivelling motion of the shower unit 12.

Figure 14A:
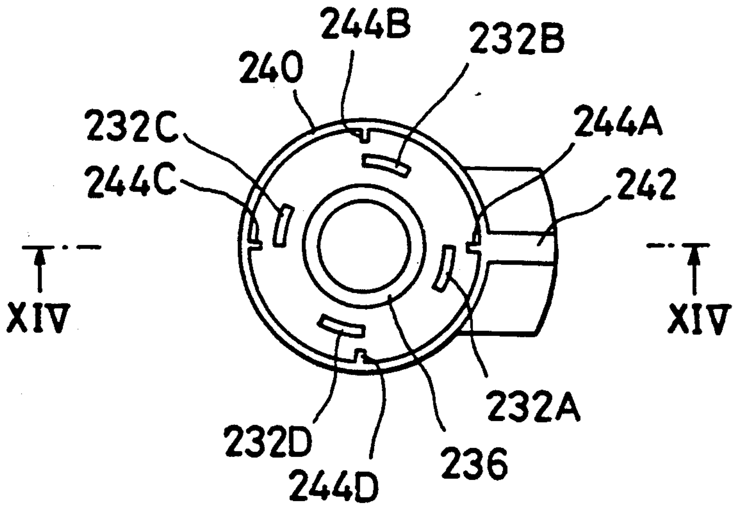
FIG. 14A is a top plan view showing a stationary contact plate forming a rotational position sensor incorporated in the shower unit.
Figure 14B:
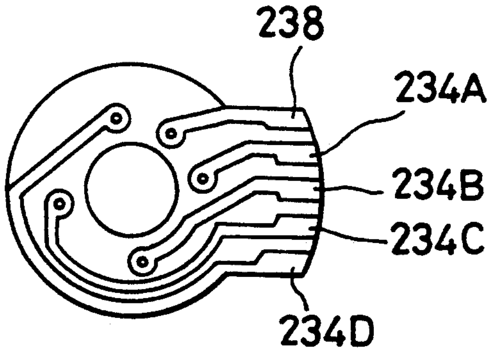
FIG. 14B is a bottom view of the contact plate shown in FIG. 14A.
Figure 14C:
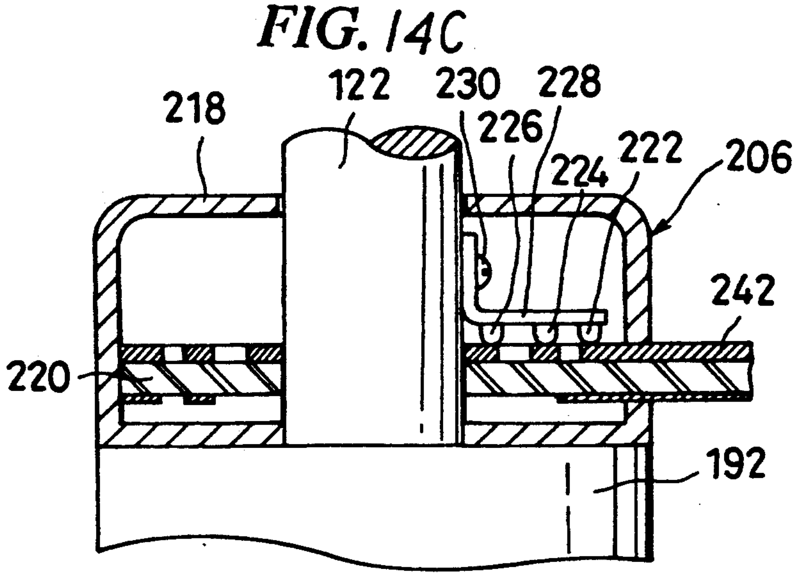
FIG. 14C is a cross-sectional view taken along the line XIV—XIV of FIG. 14A and showing the stationary contact plate and a rotary contact.

Referring to FIGS. 14A-14C, there is shown an example of the angular position sensor 206. The sensor 206 is designed to detect which one of the four spray heads 132, 134, 136 and 138 of the rotatable shower head 94 is aligned with the water outlet port 114 of the handle casing 52, as well as to detect a timing at which the DC motor 190 must be braked to correctly position the spray heads. To this end, the position sensor 206 may be comprised of a combination of five limit switches of the conventional type associated with the shaft 122. As shown, the sensor 206 includes a housing 218 to which is secured a stationary contact plate 220 provided with a printed pattern forming fixed contacts. The fixed contacts printed on the plate 220 cooperate with three rotary contacts 222,224 and 226 mounted to a rotary blade 228 fastened by a screw 230 to the shaft 122 for rotation therewith. The printed pattern includes four fixed contacts 232A-232D which are soldered to terminals 234A-234D, respectively, and which cooperate with the movable contact 224. The inner circular fixed contact 236 which is soldered to a terminal 238 is in permanent contact with the movable contact 226 and provides a ground potential. Thus, when the rotatable shower head 94 is in the position as shown in FIG. 4, the fixed contact 232A is engaged by the movable contact 224 so that the first limit switch 239A consisting of the fixed contacts 232A and 236 and the movable blade 228 is closed whereby the first spray head 132 is detected. Similarly, if the shower head 94 is rotated for 90° counterclockwise as viewed in FIG. 4, the second limit switch 239B consisting of the fixed contacts 232B and 236 and the movable blade 228 is closed whereby the second spray head 134 is detected. The third and fourth limit switches 239C and 239D including, respectively, the fixed contacts 232C and 232D will be closed in the similar manner as the head is rotated. The printed pattern also includes an outer fixed contact 240 leading to a terminal 242. This contact 240 has four narrow inwardly-directed projections 244A-244D which cooperates with the movable contact 222 to form the fifth limit switch 239E. The fifth limit switch is intended to detect the precise angular position at which, during rotation, the rotatable shower head 94 must be stopped. Therefore, the control circuit 194 is programmed such that, upon receipt of a signal from the fifth switch, it reverses electric current fed to the DC motor 190 to produce braking effect as well known in the art.

Figure 15:
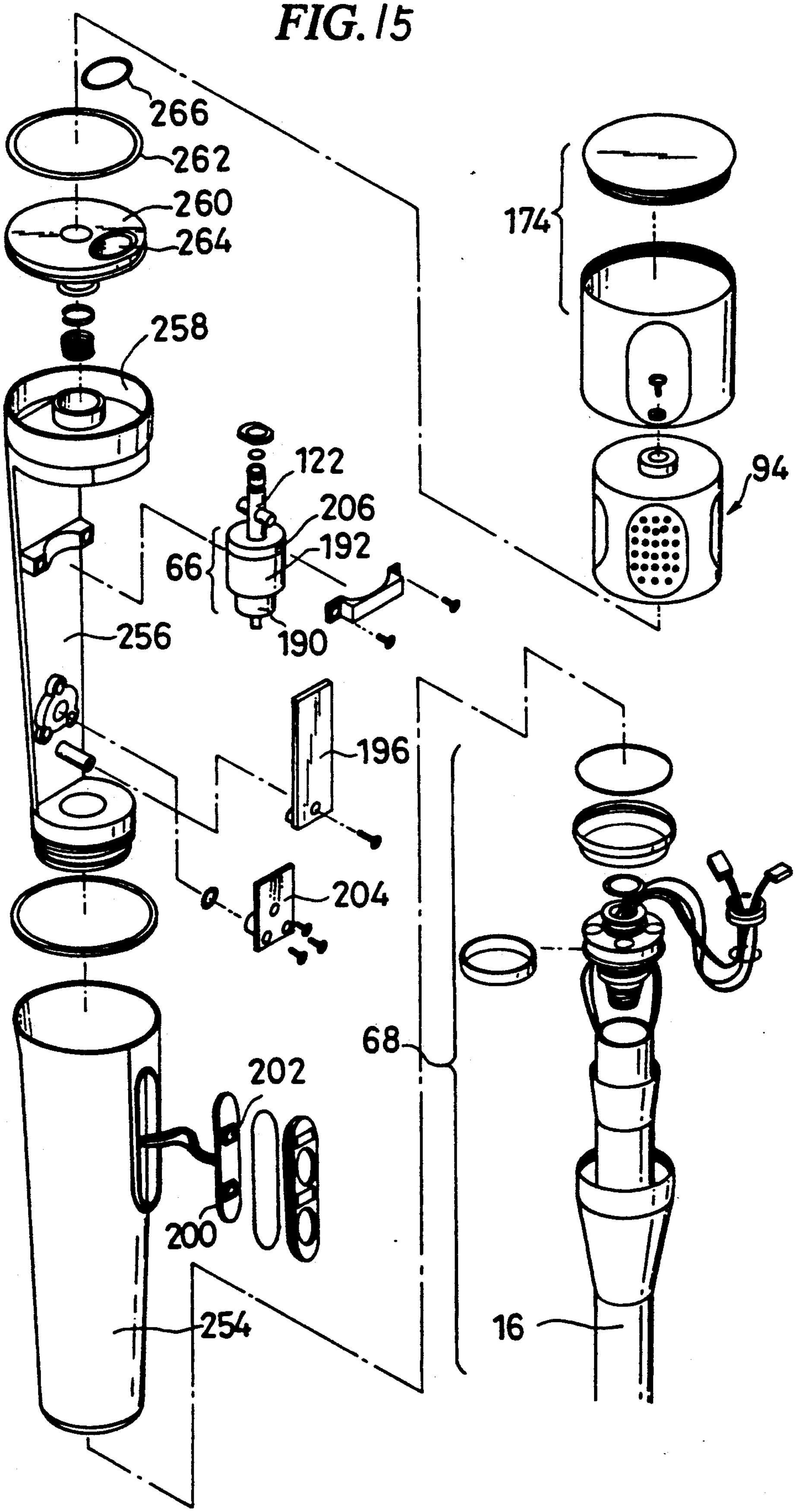
FIG. 15 is an exploded perspective view showing the modified form of the shower unit according to the invention.
Figure 16:
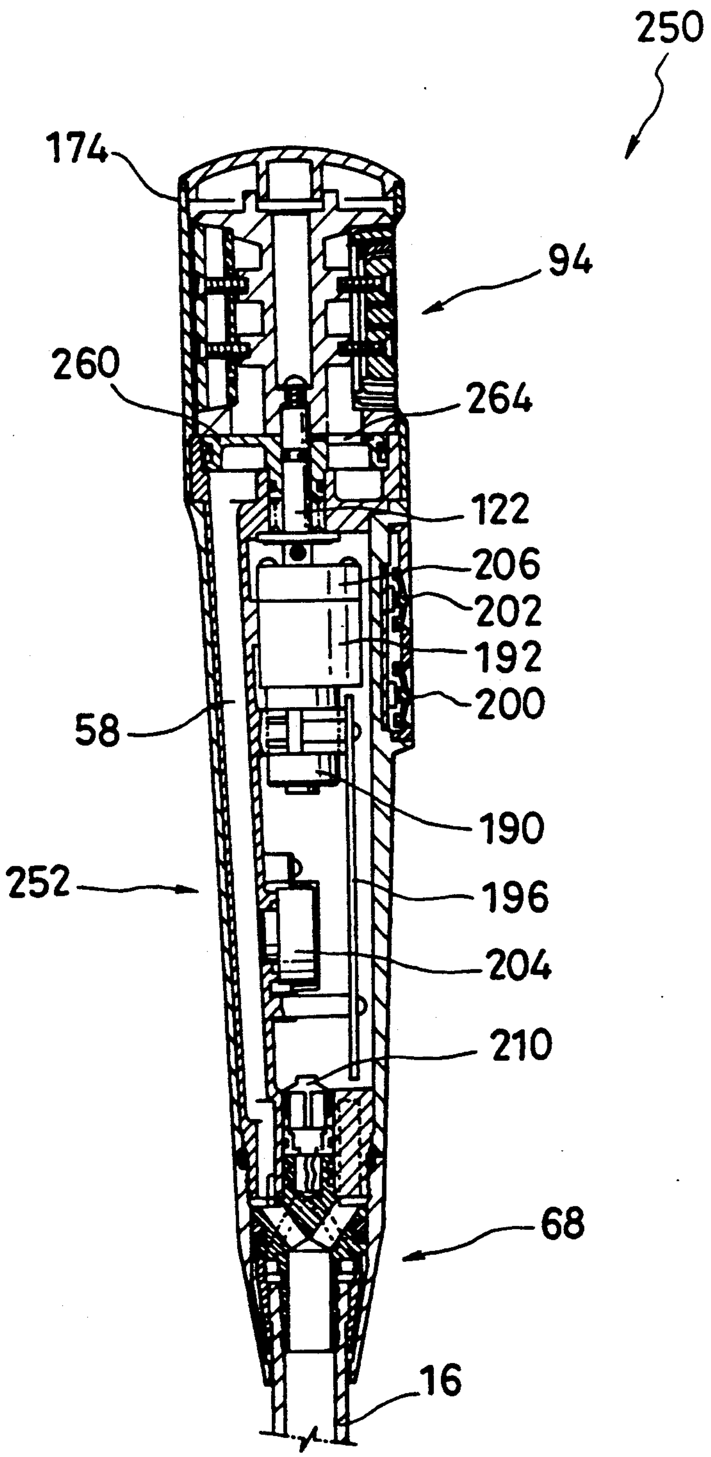
FIG. 16 is a view similar to FIG. 3 but showing the modified shower unit shown in FIG. 15.

FIGS. 15 and 16 illustrate a modified form of the shower unit. Primarily, the modified shower unit 250 differs from the shower unit 12 described hereinbefore in that, to facilitate assemblage of components, the handle casing is divided into an inner and an outer casing and that the movable sealing member is imparted an enlarged pressure receptive area to increase the sealing pressure. Parts and members similar to those described hereinbefore are indicated by like reference numerals and need not be described again. As shown, the handle casing 252 comprises an outer casing 254 and an inner casing 256 which is detachably fitted in the outer casing 254. The water conduit 58 extends through the inner casing 256 and opens into an axial bore 258 in which a movable sealing member 260 is slidably fitted and sealed by a Y-packing 262. The movable sealing member 260 is equivalent in function to the movable sealing member 104 of the first embodiment 12 and is provided with a water outlet port 264 with which the water inlets of different spray heads are selectively aligned. An O-ring 266 is similarly used around the outlet port 264 to provide a fluid tight seal between the movable sealing member 260 and the rotatable shower head 94. It will be readily apparent that in the modified shower unit 250, the movable sealing member 260 has a cross-sectional pressure receptive area which is close to the largest cross-sectional area of the handle casing 252. Accordingly, when the shower unit 250 is in use, an increased fluid tightness is established.

Figure 17:
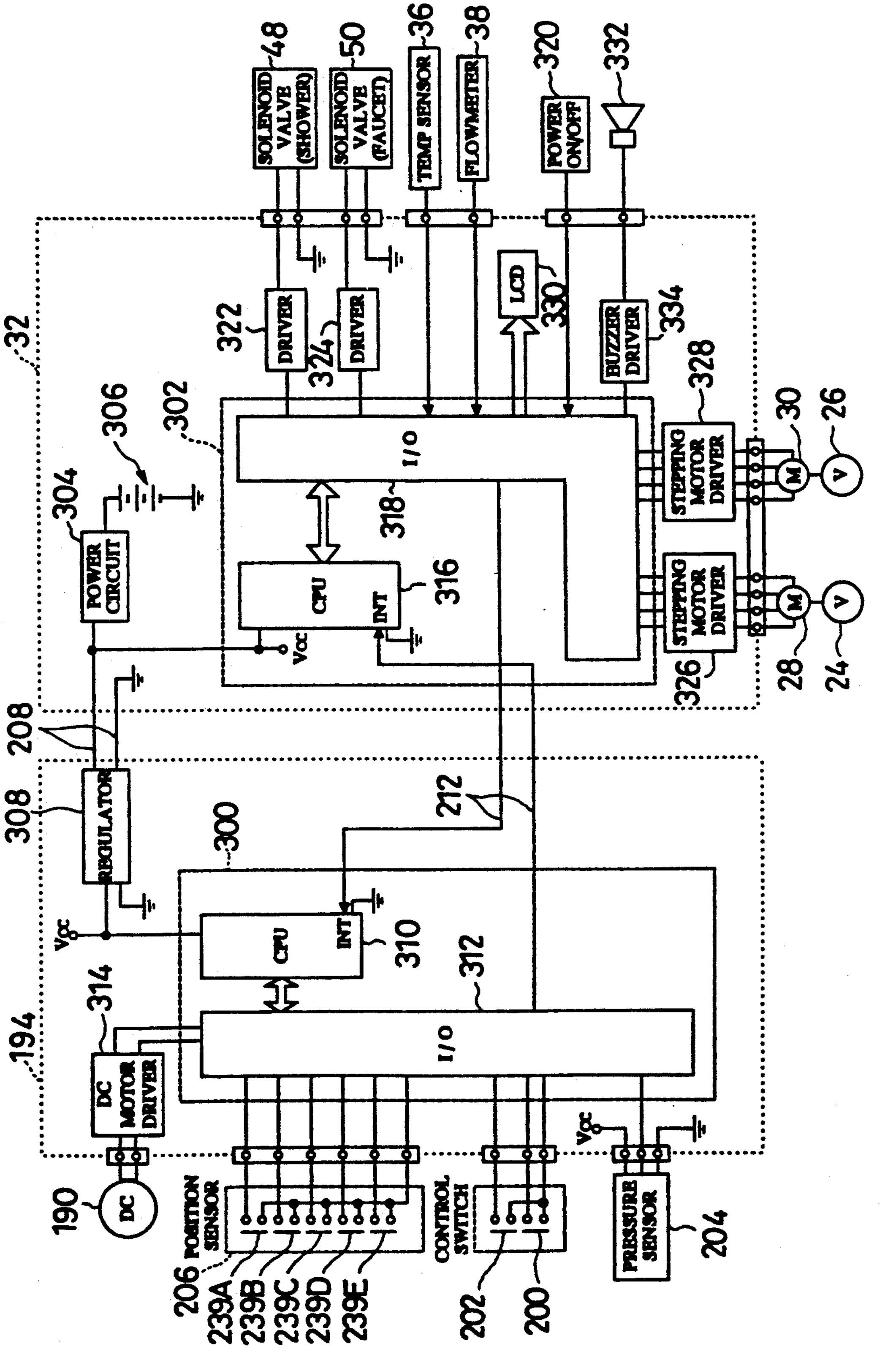
FIG. 17 is a block diagram showing an electronic control circuit for the hand-held shower unit and an electronic control circuit for the flow control unit.

Referring to the block diagram of FIG. 17, the electronic control circuit 194 for the hand-held shower units 12 and 250 and the electronic control circuit 32 for the flow control unit 14 may comprise programmable digital microcomputers 300 and 302, respectively. The control circuit 32 includes a power circuit 304 fed, for example, by a battery 306 received in the flow control unit 14. The battery 306 also feeds a voltage regulator 308 of the control circuit 194 through electric lines 208 which are wound around the flexible hose 16 as described before. The microcomputer 300 includes a central processing unit (CPU) 310 which accesses the position sensor 206, the control switches 200 and 202 and the pressure sensor 204, through an input and output interface (I/O) 312. The CPU 310 controls the DC micromotor 190 via a motor driver circuit 314 to rotate and control the rotatable shower head 94 as described later with reference to flowcharts. The microcomputer 302 includes a CPU 316 and an I/O 318. The CPU 316 accesses the mixed water temperature sensor 36, the flowmeter 38 and a power control switch 320 through the I/O 318. The CPU 316 controls the solenoid actuator 48 for the shower valve 44, the solenoid actuator 50 for the faucet valve 46, the stepping motor 28 of the flow control valve 24 for cold water line, and the stepping motor 30 of the flow control valve 26 for hot water line, respectively, through driver circuits 322, 324, 326 and 328, as described later. The CPU 316 further controls a liquid crystal display (LCD) 330 and operates an alarm buzzer 332 via driver 334.

As described later with reference to the flowcharts, the microcomputers 300 and 302 transmit and receive digital data and instructions with each other via wire lines 212. Communication is performed according to asynchronous serial data communication mode. To this end, instructions and information transmitted from the microcomputer 300 is input through a transceiver described later into an interrupt input terminal of the microcomputer 302 for processing with the topmost priority. Similarly, commands and signals transmitted from the microcomputer 302 is applied to an interrupt terminal of the microcomputer 300 for prompt processing. Since in this manner communication between the microcomputers 300 and 302 is performed digitally, it is possible to communicate data and instructions with only a pair of signal lines 212. Use of such limited number of signal lines is advantageous in providing the hose 16 with a high degree of flexibility.

Figure 18:
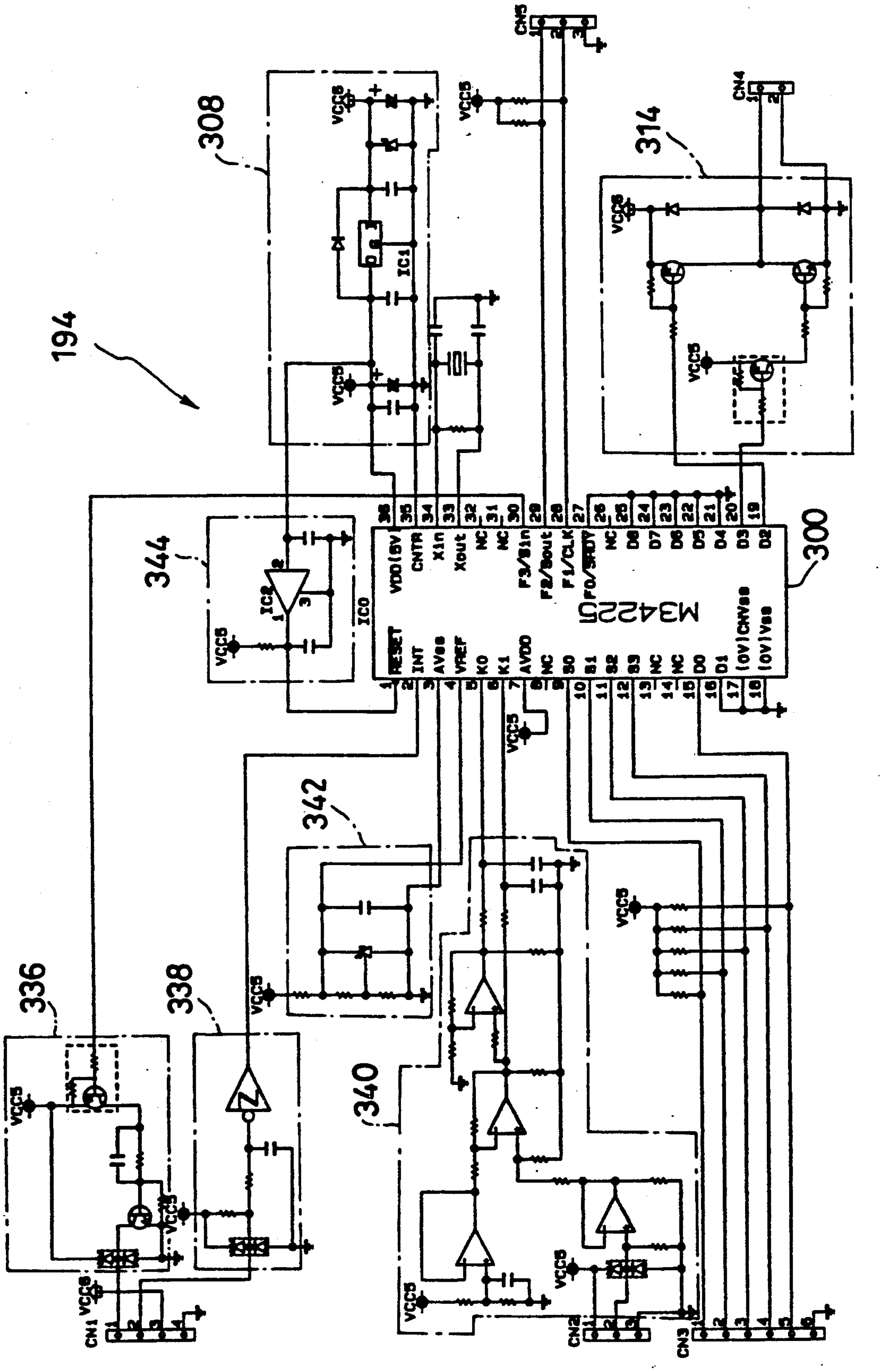
FIG. 18 is a wiring diagram of the electronic control circuit for the hand-held shower unit as implemented by using a commercially available single-chip microcomputer.

Referring to FIG. 18, there is shown a wiring diagram to enable those skilled in the art to implement the control circuit 194 shown in FIG. 17. A commercially available 8-bit single-chip microcomputer M34225, marketed by Mitsubishi Electric Corporation of Tokyo, may be used as the microcomputer 300 shown in FIG. 17. Asynchronous serial communication signals are transmitted from the microcomputer 300 via a transceiver 336. Signals from the other microcomputer 302 are received through a receiver 308 and transferred to the interrupt terminal of the microcomputer 300. Output from the pressure sensor 204 is forwarded to the microcomputer 300 via an amplifier compensator circuit 340. Voltage circuit 342 supplies a reference voltage for the pressure sensor 204. Connector indicated by the reference numeral CN3 connects the microcomputer 300 to the above-mentioned five limit switches of the position sensor 206. A voltage monitor circuit 344 monitors the voltage controlled by the regulator 308. The signals from the spray pattern control switch 200 and water supply control switch 202 are fed through a connector indicated by the reference symbol CN5. The DC motor 190 for rotating the rotatable shower head 94 may be connected to the driver circuit 314 through a connector referenced at CN4.

Figure 19:
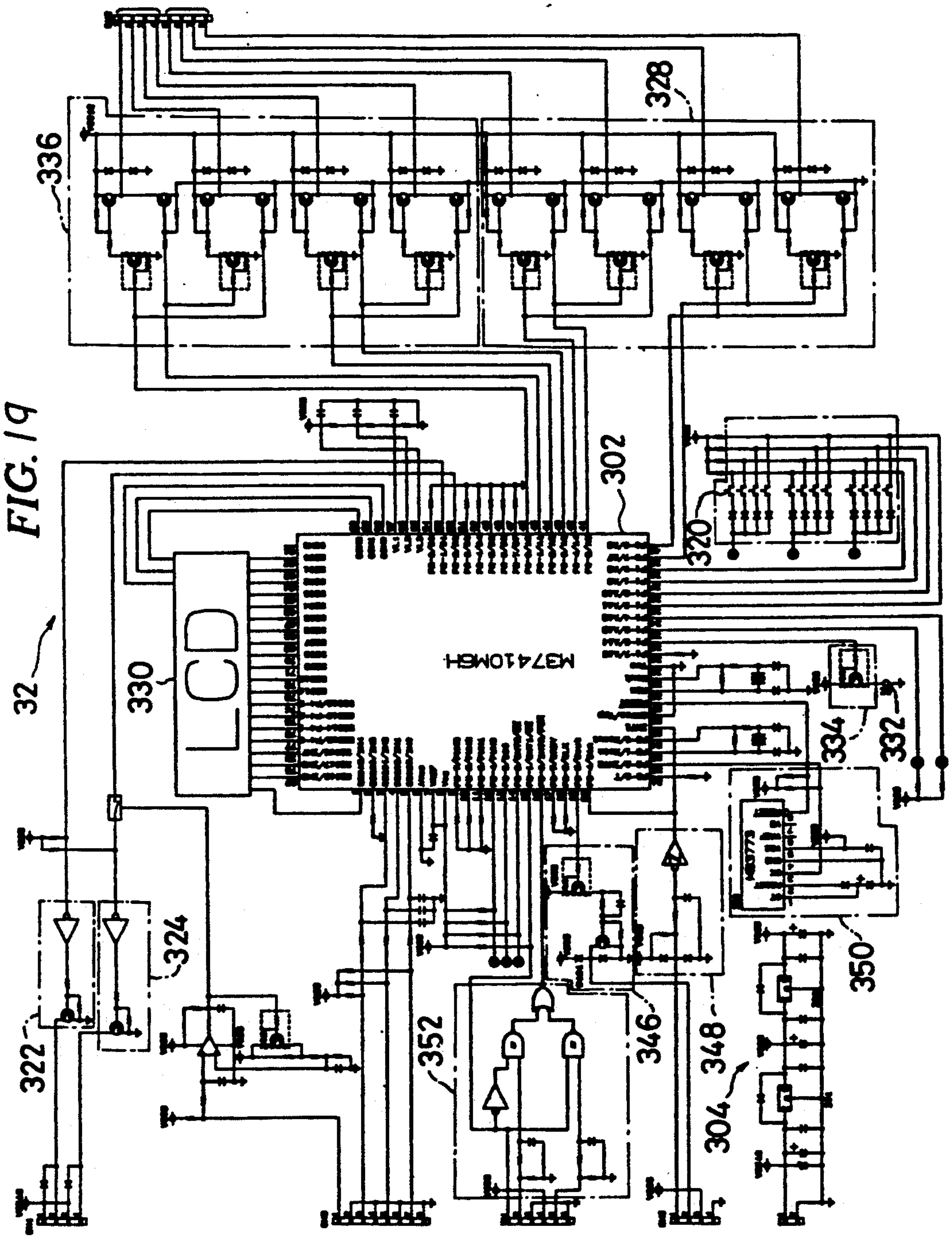
FIG. 19 is a wiring diagram of the electronic control circuit for the flow control unit as implemented by using a commercially available single-chip microcomputer.

FIG. 19 is a wiring diagram to enable those skilled in the art to implement the control circuit 32 shown in FIG. 17. In this embodiment, a 8-bit single-chip microcomputer M37410M6H, commercially available from Mitsubishi Electric Corporation, is used to implement the microcomputer 302. Communication with the microcomputer 300 for the shower unit is performed through a transmitter 346 and a receiver 348. The voltage of the power circuit 304 is monitored by a voltage monitor circuit 350 including an integrated circuit MB3773 available from Fujitsu Limited. Driver circuits 326 and 328 may be arranged as shown to control the stepping motors 28 and 30, respectively. Drivers 322 and 324 may be connected, respectively, to the solenoids 48 and 50 via a connector indicated at CN1. Output from the temperature sensor 36 is transferred to the microcomputer 302 through a connector indicated by the reference numeral CN3. Output pulses from the turbine-driven flowmeter 38 is processed by a wave-shaping circuit 352. There is also shown wiring arrangement for control switches including the power control switch 320.

Figure 20:
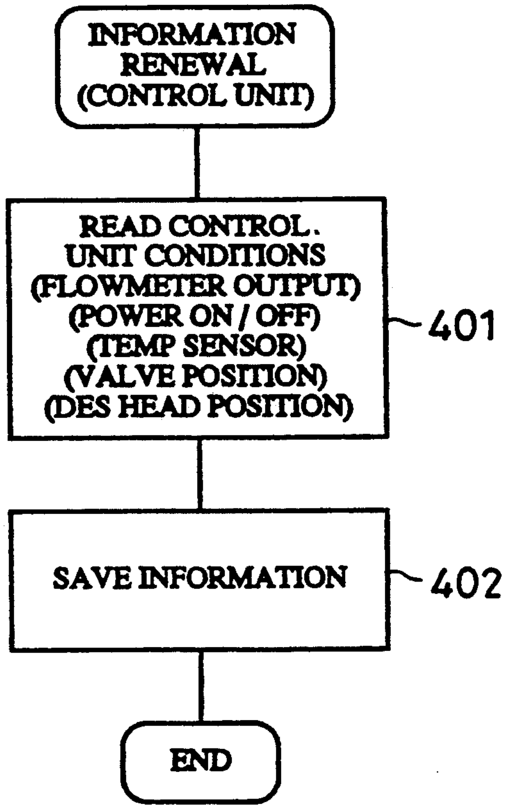
FIGS. 20-27 are flowcharts showing the functions performed by the electronic control circuits shown in FIGS. 17-19.

Referring to various flowcharts shown in FIGS. 20–27, operation of the shower unit 12 and the flow control unit 14 will be described with reference to functions performed by the CPU 310 of the shower unit control circuit 194 and by the CPU 316 of the flow control circuit 32. The CPU'es 310 and 316 are so programmed as to perform functions described below. The CPU 316 of the flow control unit 14 functions for every 15 ms, for example, as shown in FIG. 20. At function 401, the current conditions of the unit 14 are read out by checking various sensors associated with the flow control unit 14, such as flowmeter 38, power control switch 320, temperature sensor 36 for the mixed water. Positions of the shower valve 44 and the faucet valve 46 may be ascertained by checking the driver circuits 322 and 324. The desired angular position of the rotatable shower head 94 as addressed by the user and stored in the memory is also checked. As described later, the desired head position is altered one by one in sequence as the spray pattern control switch 200 is operated. The obtained information is saved at function 402.

Figure 21:
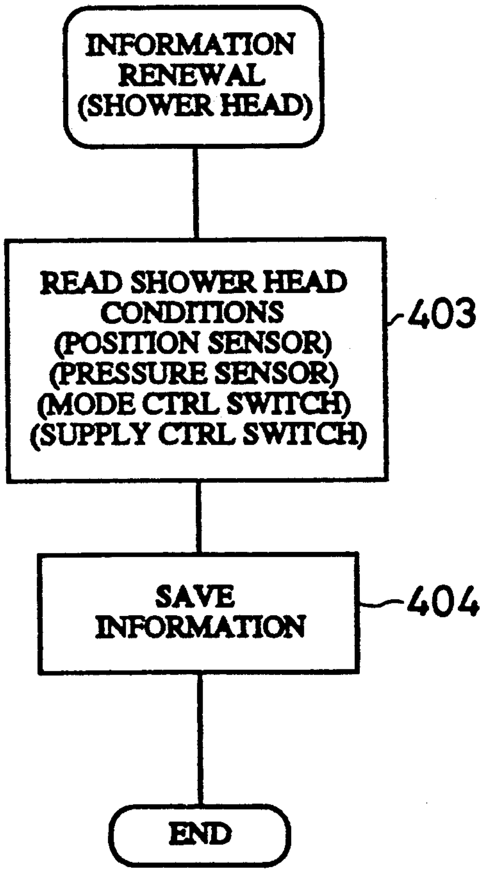

Referring to FIG. 21, the CPU 310 of the shower unit 12 functions for every 15 ms, for example, to renew the current shower head conditions. At function 403, the present conditions of the shower unit 12 are read out by checking the position sensor 206, pressure sensor 204, spray pattern control switch 200 and water supply control switch 202. The information is saved at function 404 for subsequent use.

Figures 22, 23:
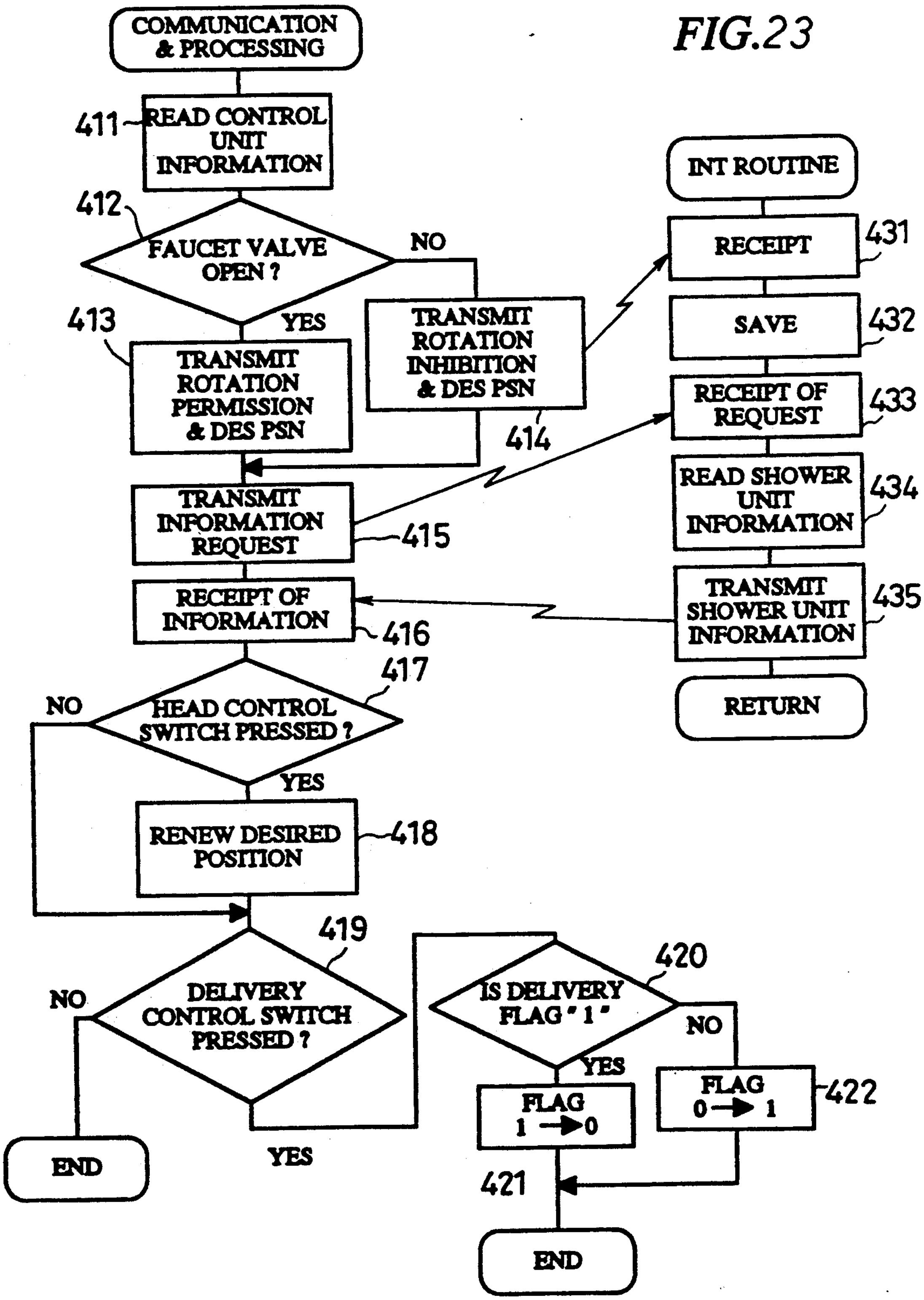

Functions shown in FIGS. 22 and 23 are primarily intended to perform data communication between the CPU'es 310 and 316. Procedures shown in FIG. 22 may be carried out by the CPU 316 for every 125 ms, for example. The interrupt routine shown in FIG. 23 is commenced whenever function 413 or 414 is performed. The CPU 316 reads out the control unit information at point 411 and at function 412 determines if the faucet valve 46 is open. If open, the water from the conduit 34 will be being drained to the faucet 18 so that the water pressure applied via the shower hose 16 to the shower unit 16 will disappear or at least will be reduced. As described hereinbefore, this is a preferred pressure condition for rotating the rotatable shower head 94 without undergoing rotational friction. Therefore, at function 413, the CPU 316 sends to the CPU 310 a permission indicating that the shower head can be rotated, together with an information indicative of the desired angular position for the shower head 94. If the faucet valve is closed, the CPU 316 sends a rotation inhibition at function 414. As mentioned before, transmission 413 or 414 is directed to the interrupt input of the CPU 310. Therefore, in response to transmission 413 or 414, the CPU 310 immediately- commences the interrupt routine of FIG. 23 to accept transmission at function 431 and save it at function 432. Then, at function 415 the CPU 316 sends an information request to the CPU 310 which responds at function 433 to receive it and to read the shower unit information at function 434 and transmits it to the CPU 316 at function 435 via the signal lines 212. Upon receipt of the shower head information at 416, the CPU 316 determines at function 417 if the pattern control switch 200 is pressed on by the user. If pressed on, the desired angular position for the rotatable shower head 94 is renewed at function 418 in such a manner that a next spray head is addressed. Then, the CPU 316 determines at function 419 whether the water supply control switch 202 is pressed on. The control switch 202 cooperates with the memory of the CPU 316 to function as a toggle switch. Thus, if the supply control switch 202 is pressed on, the CPU 316 operates at functions 420–422 to change over a flag which is stored in its memory to indicate the user's instructions. Flag "1" may be used to represent an instruction that water should be supplied to the shower unit 12, with flag "0" indicating that water supply must be interrupted. This flag is used during flow rate control as described later with reference to FIG. 26.

Figure 24:
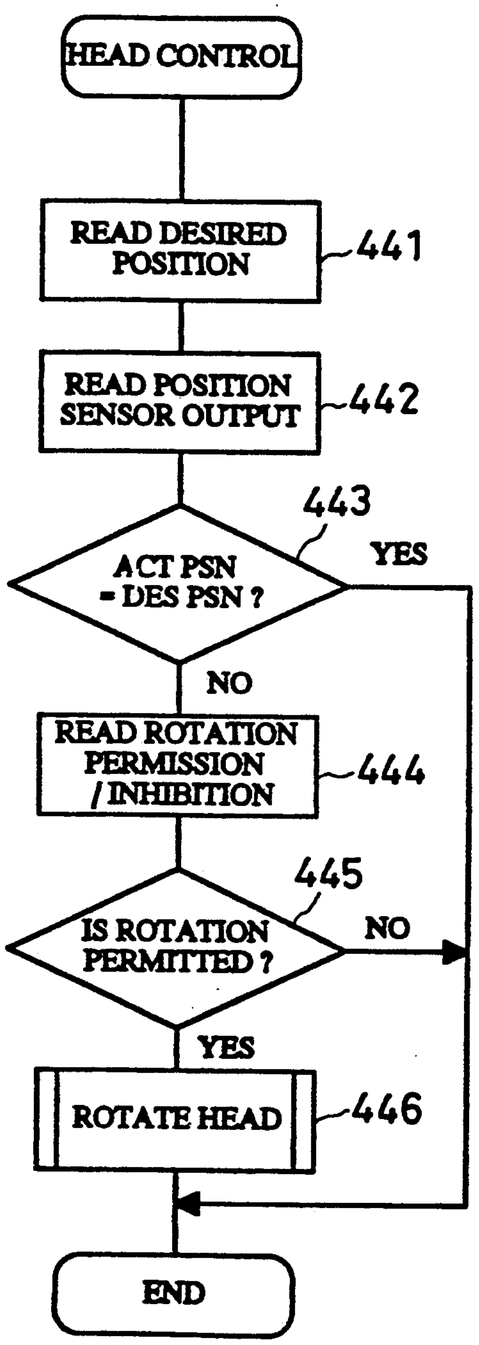

Referring to FIG. 24, functions shown therein may be performed periodically by the CPU 310 of the shower unit 12, for example, for every 2 ms. At function 441 the addressed position for the rotatable shower head 94 is read out from the memory of the CPU 310 and at function 442 the position sensor output is retrieved from the memory. Function 443 determines whether the actual angular position of the shower head 94 is in commensurate with the addressed position. If not, permission or inhibition of rotation is read out at function 444 and a decision is made at function 445 to see whether rotation is permitted. The rotatable shower head 94 is rotated at function 446 if rotation is permitted.

Figure 25:
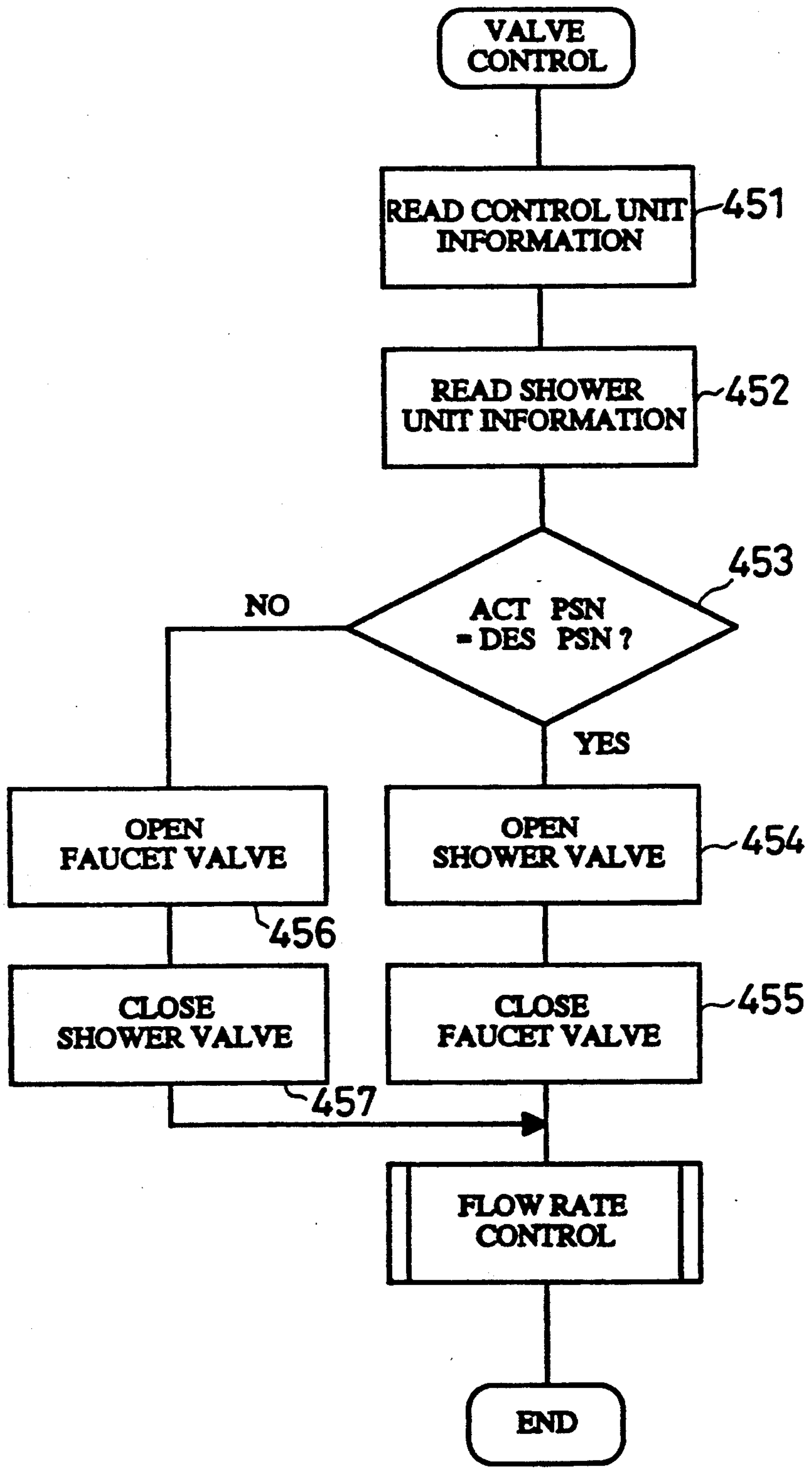

The CPU 316 performs functions shown in FIG. 25 to control various valves including shut-off valves 44 and 46 and flow control valves 24 and 26. The functions of FIG. 25 may be commenced for every 250 ms, for example. Information concerning the flow control unit 14 and the shower unit 12 is read out at functions 451 and 452, respectively. Then the CPU 316 determines at function 453 whether the current angular position of the rotatable shower head 94 is equal to the desired position addressed by the user. If equal, the solenoid 48 is signalled to open the shower valve 44 at function 454 and the solenoid 50 is signalled to close the faucet valve 46 at function 455, to supply mixed water to the shower unit 12. If not equal, the faucet valve 46 is opened at function 456 and the shower valve 44 is closed at 457 thereby to interrupt water supply to the shower unit 12. Thereafter the CPU 316 proceeds to the flow rate control functions which is shown in FIGS. 26 and 27 in a greater detail.

Figure 26:
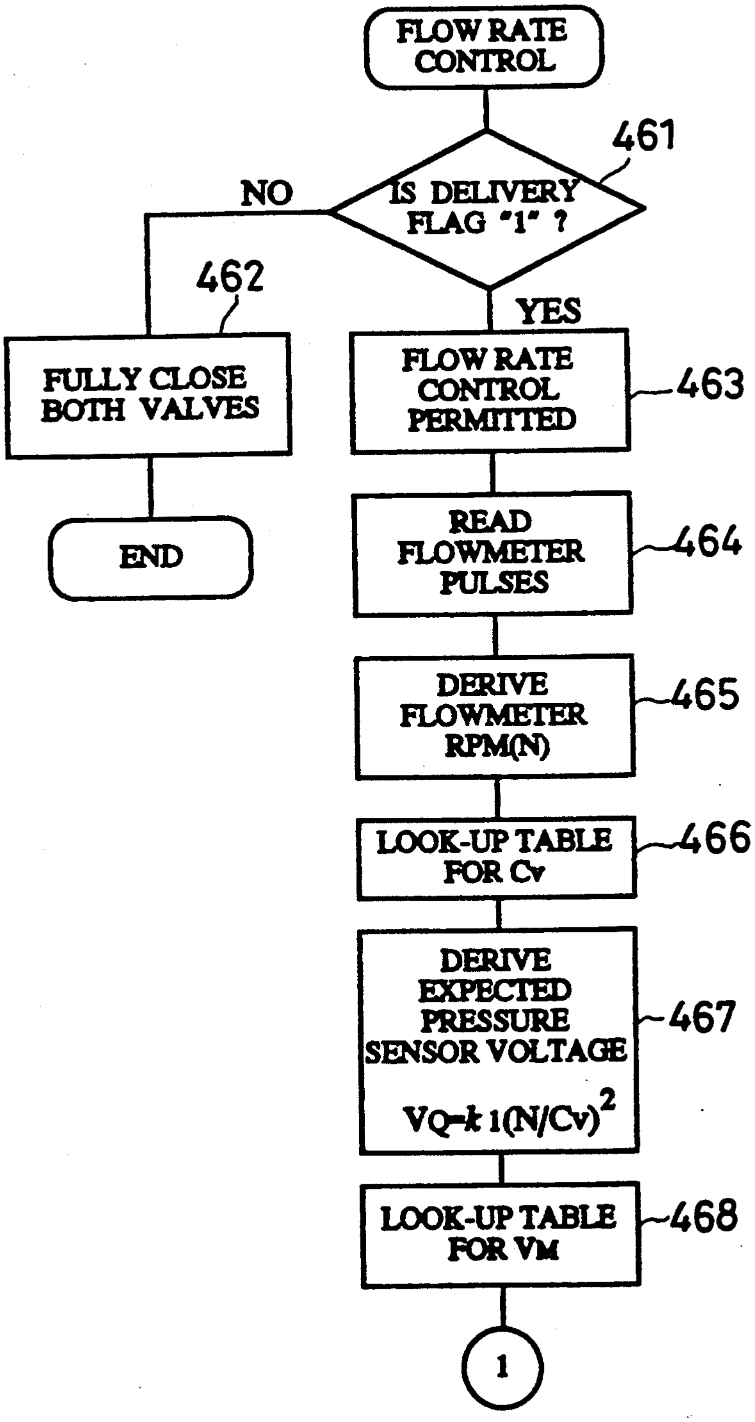
Figure 27:
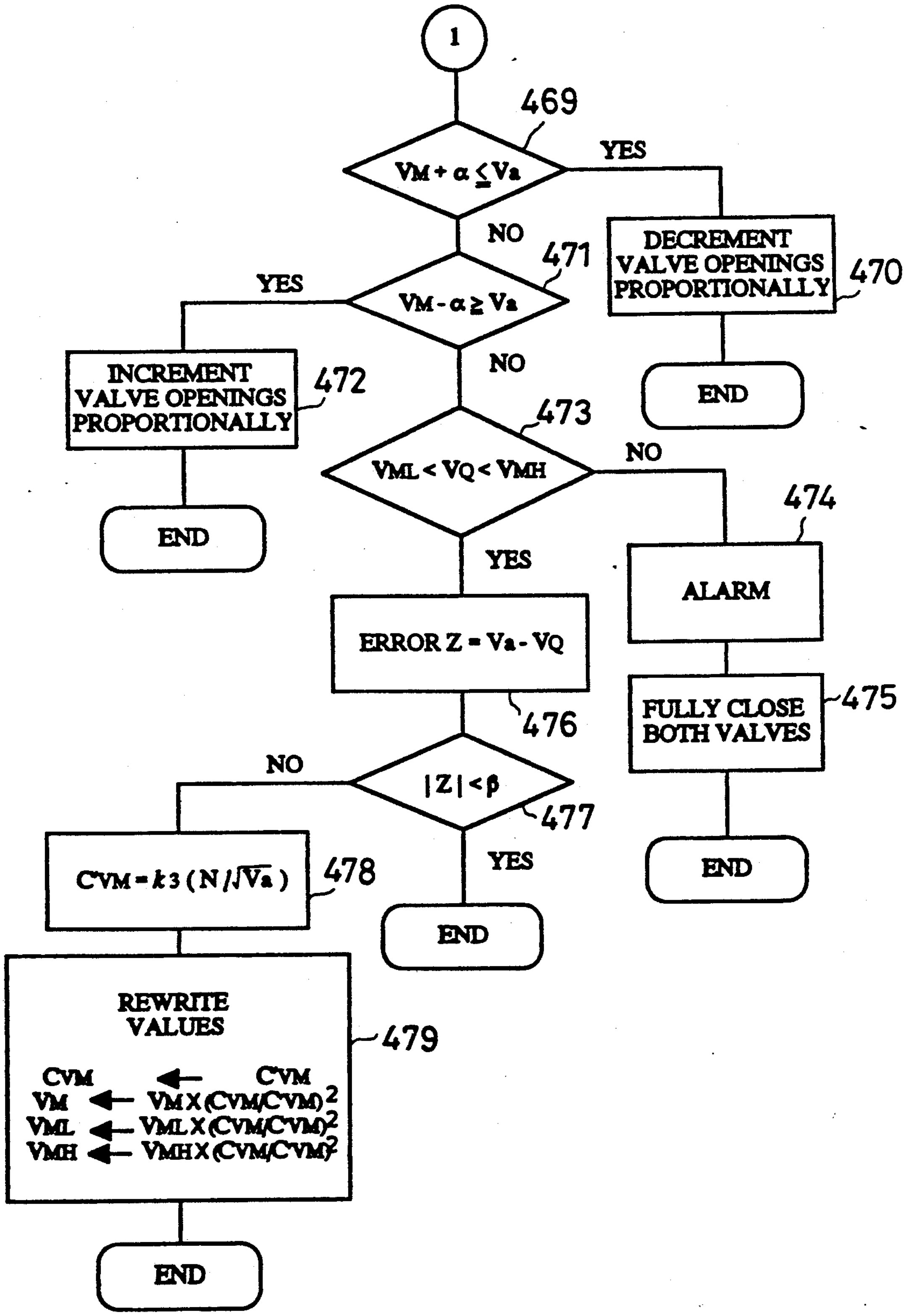

Functions shown in FIGS. 26 and 27 are intended to control the flow rate of water through the flow control valves 24 and 26 in accordance with the water pressure detected by the pressure sensor 204. Control of flow rate in response to the pressure in the water conduit 58 of the shower unit 12 is preferable because the detection of the pressure variation by the pressure sensor 204 is carried out much faster than the conventional flowmeter 38 having a turbine which requires a certain time lag before it reaches the steady state revolution. Desirable flow rate may vary depending on the spray pattern of the spray heads 132, 134, 136 and 138. For example, the spray head 136 for an aerated spray requires a relatively high flow rate, whereas the spray head 138 for the converged jets must be operated at a lower flow rate in order to prevent injury. Flow rate control is conducted in such a manner that a "desired" flow rate for the selected spray head is first determined. Then a hypothetical "measured" flow rate is derived based on the pressure sensor output. The flow control valves 24 and 26 are controlled such that the measured flow rate becomes equal to the desired flow rate. Output from the flowmeter 38 may be used as representing the "actual" or "true" flow rate as described later.

Determination of the measured flow rate is carried out based on equation:

$$Q = KCv\sqrt{P} \qquad (1)$$

wherein Q is the measured flow rate, K is a constant, Cv is a flow coefficient unique to the selected particular spray head, and P is a gauge pressure detected by the pressure sensor 204. To this end, the values of flow coefficient Cv for the spray heads 132, 134, 136 and 138 have been empirically determined and stored in the memory of the CPU 316 as a table which is shown in FIG. 28, wherein the suffix M represents generally the symbols A-D for the four spray heads.

Computation by the CPU 316 to determine Q may be simplified and speeded-up if the voltage output from the pressure sensor 204 is used as such for computation, instead of deriving the pressure P. Since the flow rate Q is roughly proportional to the revolutionary speed N of the flowmeter 38 and because the pressure sensor output voltage $V_Q$ which is expected to be delivered at the measured flow rate Q is roughly proportional to the actual pressure, the following equation can be derived from equation (1):

$$V_Q = k1(N/Cv)^2 \qquad (2)$$

Thus, in the flow rate control described below, the value $V_Q$ will be used as representing the measured flow rate Q.

The flow coefficient Cv to be stored as the table of FIG. 28 may be determined for each of the spray heads 132, 134, 136 and 138 by operating the shower unit while measuring the revolutionary speed of the flowmeter 38 and the actual voltage output of the pressure sensor 204. The flow coefficient Cv may then be calculated according to equation:

$$Cv = k2(N/\sqrt{Va}) \qquad (3)$$

which is derived from equation (2) above and wherein k2 is a constant, N is the revolutionary speed of the flowmeter 38 and Va is the actual voltage output of the pressure sensor 204.

Referring now to FIGS. 26 and 27, at function 461 the flag is checked to see if water supply is desired. If the flag is "0" indicating that water supply is not needed, at function 462 the stepping motors 28 and 30 are driven to fully close both of the flow control valves 24 and 26. If the flag is "1" indicating that water supply to the shower unit 12 is needed, control of the flow control valves 24 and 26 is permitted at function 463. Then at function 464 the output pulses from the turbine-driven flowmeter 38 are input and the revolutionary speed N of the flowmeter is calculated based on the interval between pulses in the well known manner. Function 466 looks-up the table shown in FIG. 28 to see the value Cv of the selected spray head. Then at function 467, the expected output voltage $V_Q$, which is anticipated as being issued from the pressure sensor 204 when the flow rate is equal to Q, is computed according to equation (2). At function 468 the table is looked up to see the desired pressure sensor output voltage $V_M$ which corresponds to the desired flow rate for various spray heads. The desired flow rate may be in the range of 7-13 liters per minute for the normal spray, 10-16 liters per minute for the non-restricted flow, 9-15 liters per minute for the aerated spray, and 5-11 liters for the converged spray. The values $V_M$ of the desired pressure sensor output voltage corresponding to the foregoing desired flow rates have been empirically determined preliminarily and included in the table. Then at function 469, the CPU 316 determines if the actual pressure sensor voltage Va is equal to or greater than $V_M$ plus alpha. If it is, at function 470 the CPU 316 decrements the openings of both flow control valves 24 and 26 proportionally so as to decrease the flow rate. If it is not, then function 471 determines whether the the actual pressure sensor voltage Va is equal to or smaller than $V_M$ minus alpha. If it is, at function 472 the CPU 316 increments the openings of both flow control valves 24 and 26 proportionally so as to increase the flow rate. If the value Va is between $V_M$ plus/minus alpha, then at function 473 the CPU 316 compares the expected pressure sensor voltage $V_Q$ with the minimum allowable voltage $V_{ML}$ and the maximum allowable voltage $V_{MH}$ stored in the table to confirm whether the actual flow rate is in a allowable range. If it is not, an alarm is done at function 474 by energizing the buzzer 332 and an LED and at function 475 the valves 24 and 26 are fully closed. If in the allowable range, then at function 476 the error between Va and $V_Q$ is calculated to determine the deviation of the pressure sensor output from the flowmeter output. Then at function 477 it is determined whether the detected error is less than a permissible range. If not, it is determined that the flow coefficient $C_{VM}$ of the table of FIG. 28 is no longer valid for any reasons such as clogging of the fluid path. Then, at function 478 a corrected flow coefficient value $C'_{VM}$ is derived using the indicated equation wherein a different constant k3 is employed instead of the constant k2 of equation (3). Finally, the old values for $C_{VM}$, $V_M$, $V_{ML}$, and $V_{MH}$ are renewed at function 479.

Figure 29:
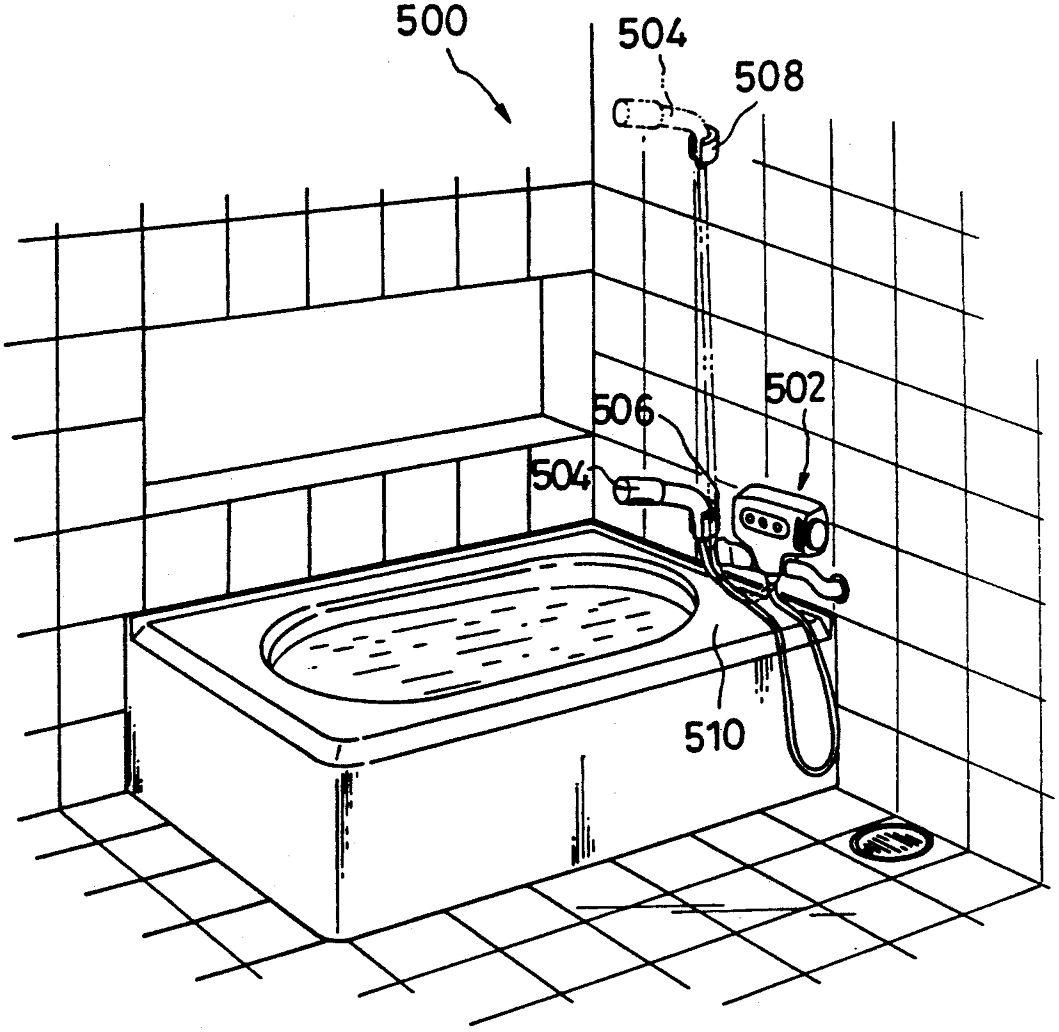
FIG. 29 is a perspective view illustrating a shower bath facility according to another embodiment of the invention.

FIG. 29 illustrates a shower bath arrangement according to the second embodiment of the invention. In this embodiment, the shower unit is designed such that, in addition to the manual spray pattern control function described hereinbefore, the spray heads are automatically rotated and selected to change over the spray or water delivery characteristics in response to the position in which the shower unit is situated. The shower bath system 500 includes a flow control unit 502 which is similar to the flow control unit 14 described above. A shower unit 504 is similar in principle and structure to the shower unit 12 or 250 described before, except that it is adapted to cooperate with a pair of shower hangers 506 and 508 fixed on the wall of the bath room. As shown, the first or lower hanger 506 is located in the vicinity of the bath tub 510 so that mixed water flowing out of the shower unit 504 as hanged on the first hanger 506 is poured into the bath tub through a short distance of fall. The second or upper hanger 508 may be situated at some higher location.

Figure 30:
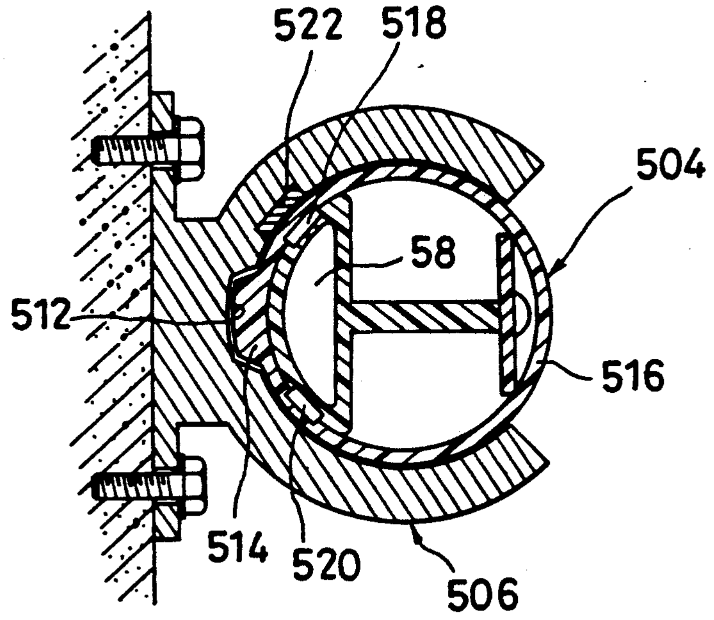
FIG. 30 is a horizontal cross-sectional view of the shower unit shown in FIG. 29 as hanged on the first hanger.
Figure 31:
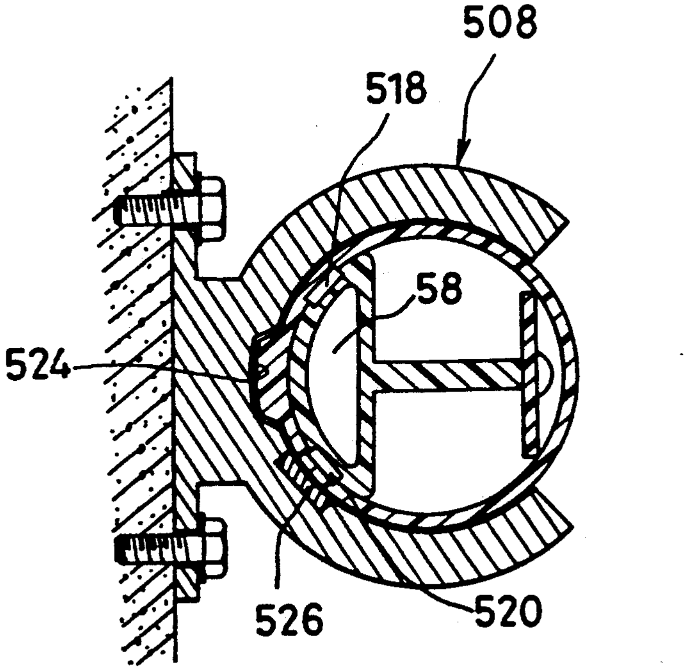
FIG. 31 is a horizontal cross-sectional view of the shower unit of FIG. 29 as hanged on the second hanger.

Referring to FIG. 30 wherein the horizontal cross-section of the shower unit 504 as hanged on the first hanger 506 is shown, the hanger 506 has a positioning recess 512 which is adapted to mate with an associated positioning projection 514 formed on the handle casing 516 of the shower unit 504. It will be understood that due to the presence of the positioning arrangement, the shower unit 504 will be placed at a fixed orientation. The shower unit 504 is provided with a pair of magnetically-operated normally-open reed switches 518 and 520 which are spaced apart at both sides of the projection 514. A first permanent magnet segment 522 is provided on the inner wall of the hanger 506 in registration with the reed switch 518. Referring to FIG. 31 illustrating the horizontal cross-section of the shower unit 504 as hanged on the second hanger 508, the second hanger 508 is similarly provided with a positioning recess 524 cooperating with the positioning projection 514 of the handle casing 516. The second hanger 508 has a second permanent magnet segment 526 which magnetically cooperates with the second reed switch 520 of the shower unit 504. With this arrangement, as the shower unit 504 is hanged on the first hanger 506, the first reed switch 518 will be closed. When the shower unit 504 is hanged on the second hanger 508, the second reed switch 520 will be closed. These reed switches 518 and 520 are connected to the control circuit of the shower unit 504 which may be identical to the control circuit 194 described before. The wiring arrangement may be such that the CPU 310 accesses the reed switches 518 and 520 through the I/O interface 312. Similarly, the control circuit 32 described above may be used with minor modification in program which will be described below with reference to FIG. 32.

Figure 32:
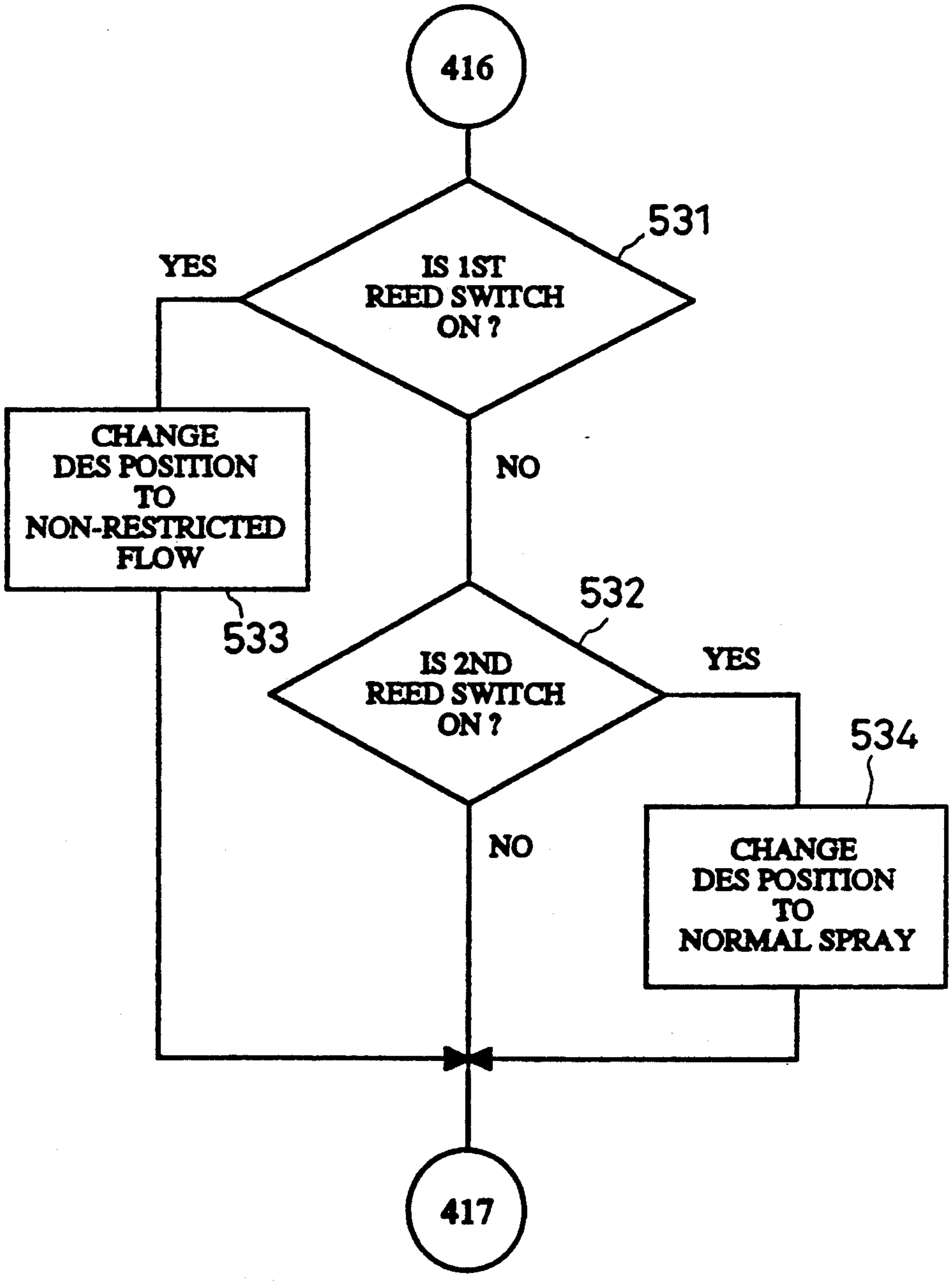
FIG. 32 is a flowchart showing additional functions to be performed by the control circuit for the flow control unit in order to operate the system shown in FIGS. 29-31.

Functions described with reference to the flowcharts shown in FIGS. 20–27 may be modified to the extent that the CPU 310 of the shower unit 504 transmits to the CPU 316 of the flow control unit 502 an information concerning the position of the reed switches 518 and 520 and that between functions 416 and 417, functions 531–534 shown in FIG. 32 are performed. Referring to FIG. 32, at function 531 the CPU 316 determines if the first reed switch 518 is closed. Closure of the first switch 518 means that the shower unit 504 is hanged on the lower first hanger 506. Thus, if it is closed, at function 533 the CPU 316 alters the desired angular position for the rotatable head 94 in such a manner that the spray head 134 for the non-restricted flow pattern is selected. As the head is rotated to the aimed angular position, mixed water will supplied in the form of nonrestricted flow 150 illustrated in FIG. 4. Water supply in this flow mode is advantageous when feeding the bath tub 510 through the shower unit 504, because a columnar flow of water issuing from the enlarged single discharge opening 148 is less likely to be cooled during fall. Therefore, a conventional faucet for the bath tub may be omitted and the hand-held shower unit 504 of the invention may be used also for the purpose of feeding the bath tub. In that case, the CPU 316 may be programmed such that it monitors via the flowmeter 38 the quantity of water being fed to the bath tub and that water supply is automatically terminated when the measured quantity of water becomes equal to a predetermined quantity.

If the first switch is not closed, then at function 532 the CPU 316 checks the second reed switch 520 to see if it is closed. If it is, meaning that the shower unit 504 is hanged on the upper second hanger 508, then the CPU 316 changes the desired position so that the spray head 132 adapted to normal spray is addressed. As the rotatable shower head 94 is rotated to the addressed position, water will be delivered in a normal diverging spray pattern. In this manner, the spray or water delivery pattern is automatically switched over depending on the position at which the shower unit is hanged.

Figure 33:
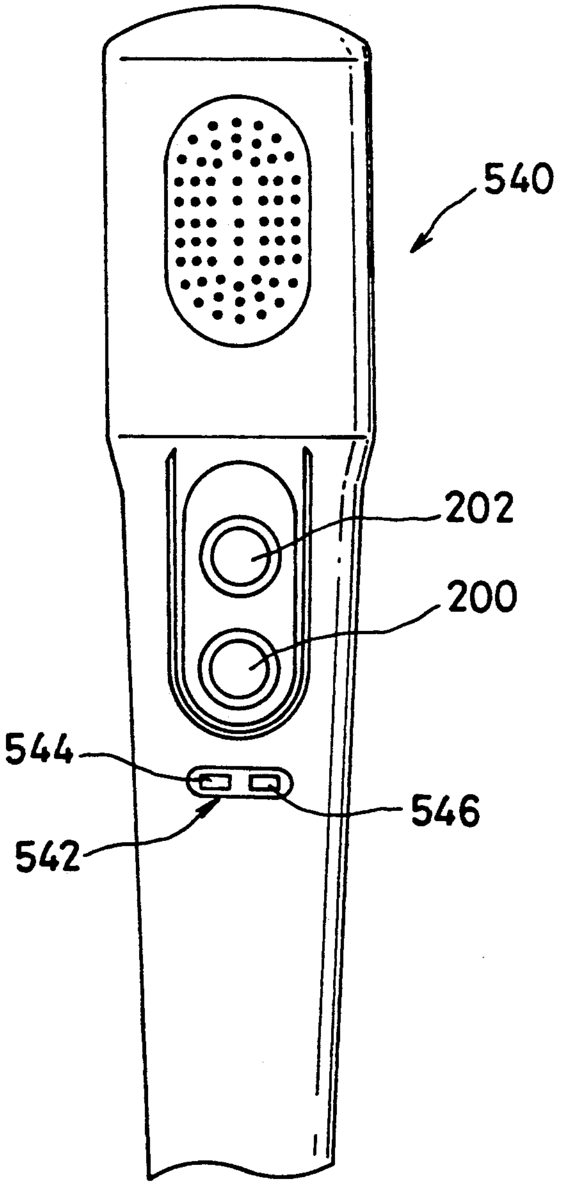
FIG. 33 is an elevational partial view showing another form of the shower unit.

FIG. 33 illustrates another form of the shower unit which may be used in the shower bath system 500 described above in place of the hanger-sensing shower unit 504. Referring to FIG. 33, the shower unit 540 may be identical to the shower unit 12 or 250 described before, except that a conventional optical distance sensor 542 is provided in addition to the manual control switches 200 and 202. Optical distance sensors suitable for the purposes of the present invention are commercially available from various sources and includes the position sensitive distance detector available from Sharp Corp. of Osaka. Such distance sensor includes a collimator lens 544 through which near infrared radiation emitted by an LED, not shown, is forwardly projected. Radiation reflected by the shower bather is collected by an objective 546 and an image is focused on a linear photosensor, not shown. The sensor 542 is designed such that the dimension of the image focused on the photosensor varies according to the distance between the object and the sensor 542 so that the photosensor issues varying output in response to the distance. The output of the distance sensor 542 is read out by the CPU 310 of the control circuit 194 and is transferred to the CPU 316 of the control circuit 32 in the similar manner as described before. The CPU 316 may be programmed to rotate the spray head of the shower unit 540 such that an aerated anti-splash spray is delivered when a relatively short distance is sensed, a normal diverging spray is delivered when a medium distance is sensed, and a non-restricted flow is delivered when a relatively long distance is sensed.

Figure 34:
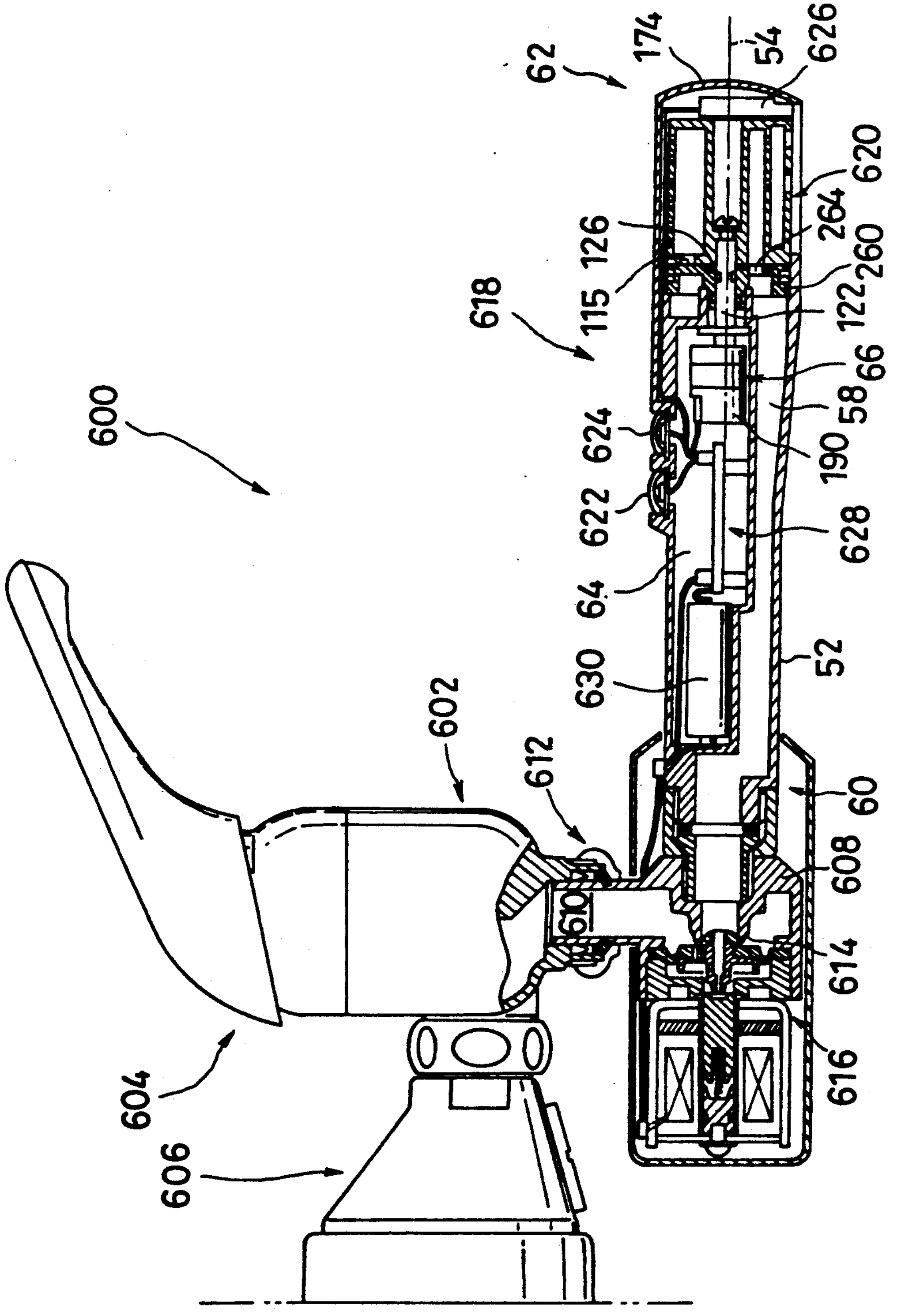
FIG. 34 is a cross-sectional view showing a faucet arrangement embodying the invention.

Referring to FIG. 34, there is shown another embodiment of the invention as applied to a faucet for use with residential sinks and wash basins. The faucet 600 includes faucet body 602 incorporating a conventional single-lever mixing valve 604 as connected by an inlet fitting 606 to sources of cold water and hot water. An outlet fitting 608 having a water passage 610 is swivelled at 612 to the faucet body 602 in the conventional manner. The fitting 608 has a valve seat 614 formed across the passage 610 which is opened and closed by a conventional latching-type pilot-operated solenoid valve assembly 616. The faucet 600 further includes a faucet spout 618 threadingly connected fluid tightly to the outlet fitting 608. The faucet spout 618 is generally similar in structure and principle to the shower unit 12 or 250 described hereinbefore, except for the points described below. Therefore, parts and members equivalent to those described before will be indicated by like reference numerals and will not be described again.

In the faucet applications, the faucet spout 618 may includes a rotatable water delivery head 620 which is adapted to deliver water in, for example, three different water delivery patterns including an aerated anti-splash spray, a non-restricted flow and a non-aerated normal spray. Modifications to be rendered on the rotatable spray head 94 and the associated angular position sensor 206 described above to design the three-pattern delivery head 620 would be obvious for those skilled in the art from the foregoing description and detailed explanation would not be needed. Selection of water delivery pattern may be made both in manual and automatic modes. To this end, a mode control switch 622 is provided in addition to a manual delivery pattern control switch 624 to enable the user to select the desired mode at its own volition. In the automatic mode, the water delivery pattern is automatically switched over in response to the distance between the rotatable head 620 and the object under the faucet, such as dishes and vegetables. To this end, an optical distance sensor 626 similar to that described with reference to FIG. 33 is provided at the second end 62 of the faucet spout 618. An electronic control circuit 628 is similarly housed in the inner cavity 64 of the casing 52. A battery 630 in the cavity 64 is adapted to supply electric power to the control circuit 628 as well as to the latching-type solenoid valve 616.

Figure 35:
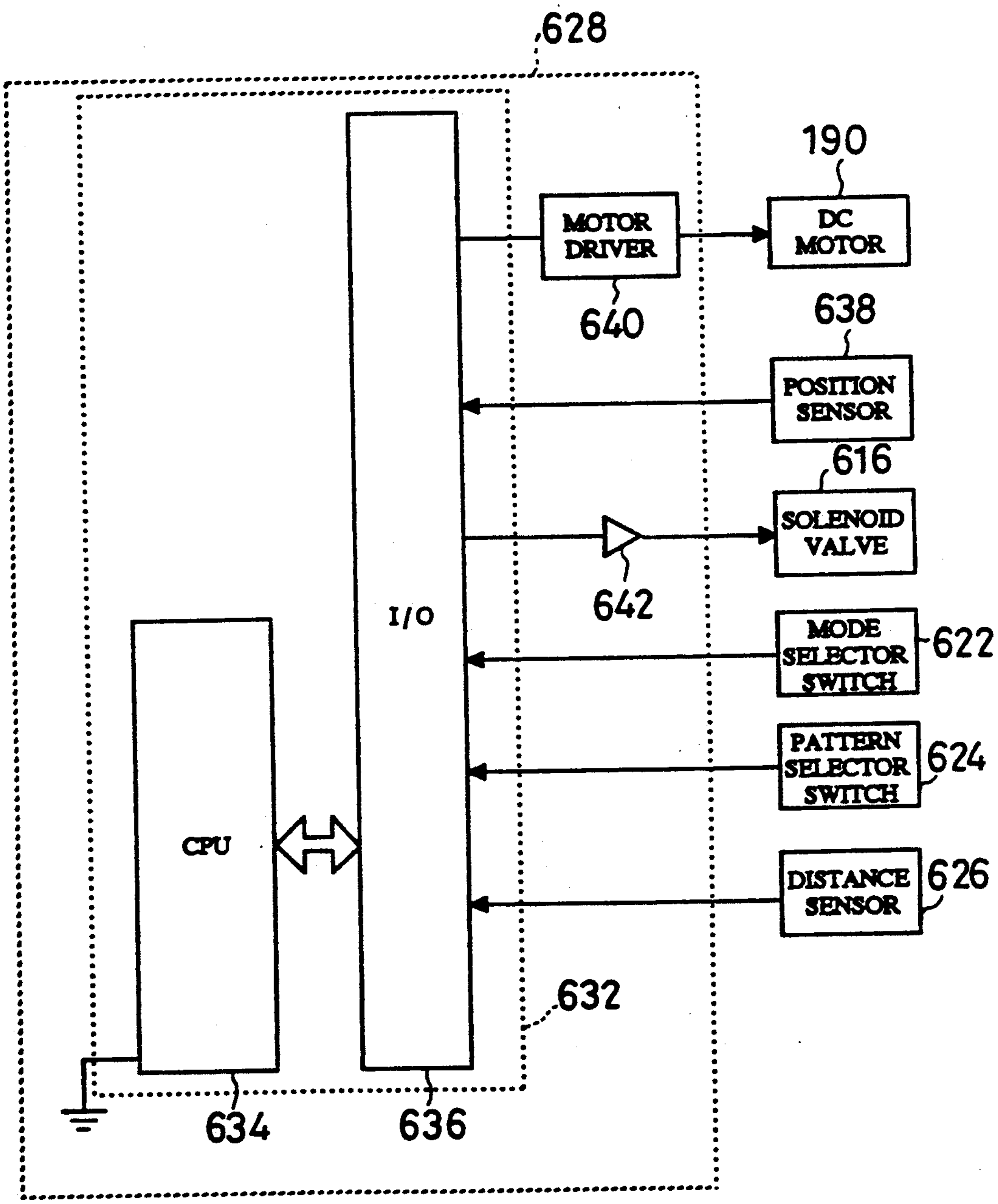
FIG. 35 is a block diagram showing the control circuit of the faucet illustrated in FIG. 34; and, FIGS. 36 and 37 are flowcharts showing functions performed by the control circuit shown in FIG. 35.

As shown in FIG. 35, the control circuit 628 includes a microcomputer 632, with a CPU 634, which may be implemented by the M34225 chip described above. The CPU 634 accesses through an I/O 636 the control switches 622 and 624, the distance sensor 626 and an angular position sensor 638 associated with the shaft 122, controls the motor 190 through a driver circuit 640, and controls the solenoid valve 616 via an amplifier circuit 642 in the following manner.

Figure 36:
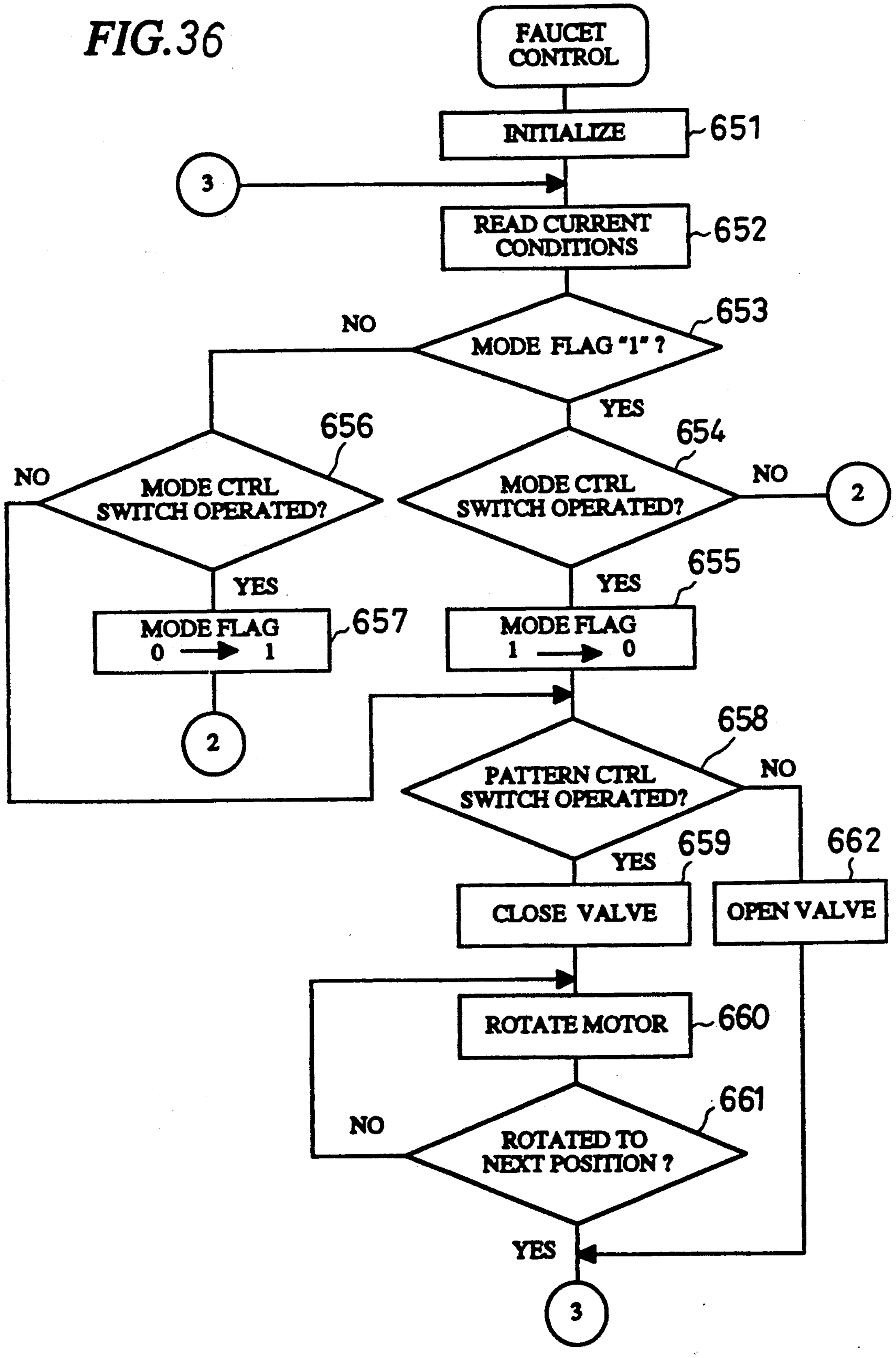
Figure 37:
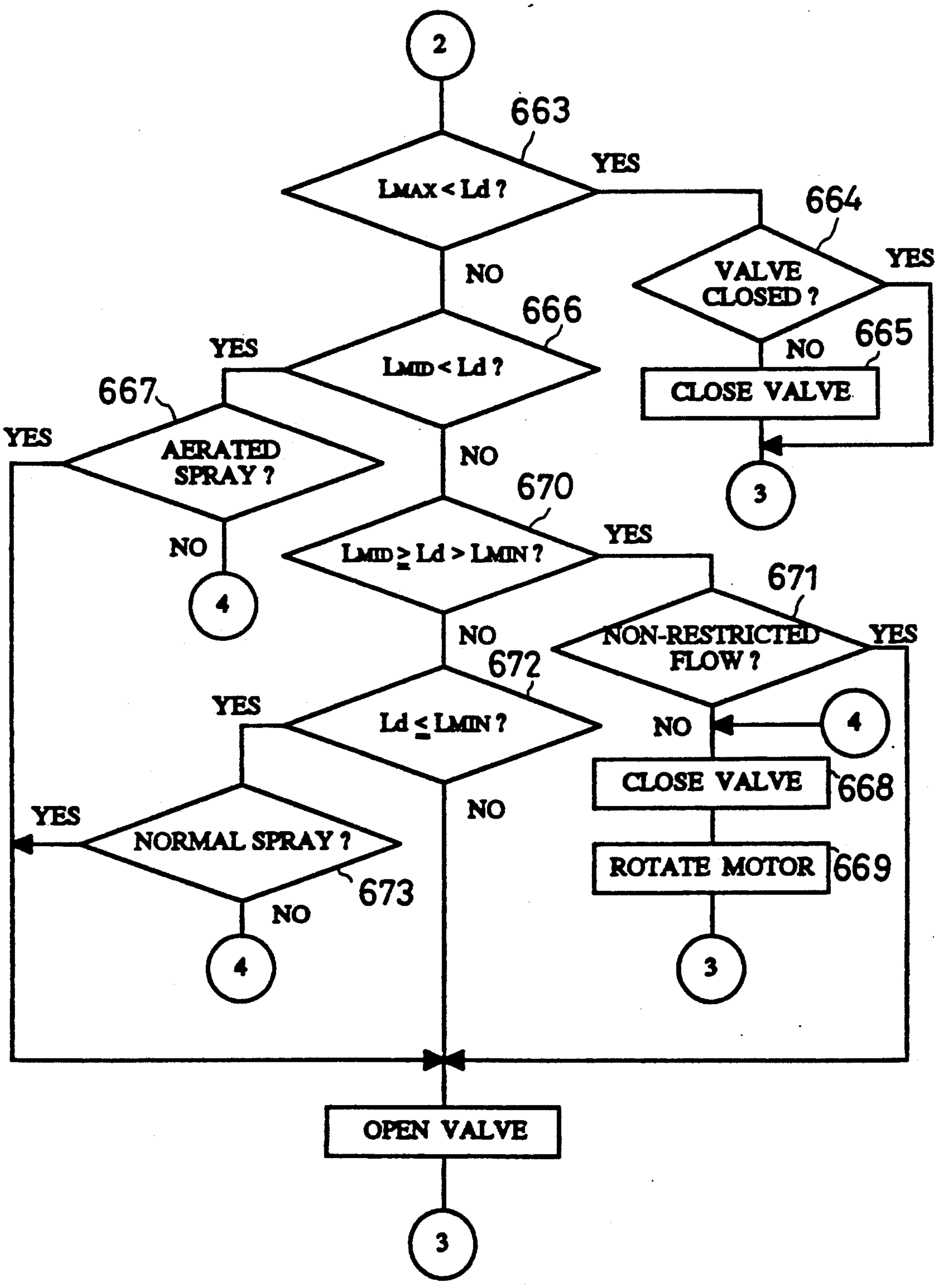

Referring to FIGS. 36 and 37, there are shown functions performed by the CPU 634 to control the faucet 600. Unlike the microcomputer 300 which is programmed to communicate with the microcomputer 302 of the flow control unit 14, the microcomputer 632 independently controls the faucet 600. Therefore, the functions shown may be performed continuously as long as the battery 630 is alive. During initialization 651, a flag indicating the mode of operation of the faucet 600 is set to "1" and the solenoid valve 616 is closed. In this regard, flag "1" may be used to represent the automatic mode wherein water delivery pattern is to be determined automatically in response to output from the distance sensor 626, whereas flag "0" may be used to indicate that a manual selection of delivery pattern is desired. At function 652, present conditions of the faucet are read out by accessing to the switches 622 and 624, the angular position sensor 638 and the distance sensor 626. Functions 653–657 are performed to ensure that the mode control switch 622 operates as a toggle switch, meaning that the mode is changed over alternately each time the switch 622 is pressed on. Thus, if it is determined at function 653 that the flag is "1" , then at function 654 the CPU 634 checks the mode control switch 622 to see if it is pressed on. If pressed upon, indicating that the mode is now to be switched over, then at function 655 the mode indicator flag is changed to "0" . If not pressed upon, indicating that the mode is now automatic and that no mode change is necessary, then the CPU 634 proceeds to functions shown in FIG. 37 to control the faucet in the automatic delivery pattern control mode. Similarly, if at function 653 it is determined that the flag is not "1" , then at function 656 the mode control switch 622 is checked to see whether it is pressed. If not pressed, indicating that manual control is still selected, then the CPU 634 proceeds to functions 658–661 to control the faucet in the manual pattern selection mode. If the switch 622 is pressed on, meaning that automatic control mode is now requested, then at function 657 the flag is changed to "1" and the automatic pattern control functions shown in FIG. 37 is commenced.

Referring to the manual control functions 658–661, at function 658 the CPU 634 checks the manual pattern control switch 624 to see if it is actuated. It not actuated, the solenoid valve 616 is kept open. If the switch 624 is actuated, indicating that the user is now desiring that the water delivery pattern of the faucet 600 be changed, then at function 659 the valve 616 is closed to ensure that water pressure in the water conduit 58 disappears and that the rotatable water delivery head 620 is smoothly rotated without undergoing rotational friction by the movable sealing member 260. The CPU 634 signals at function 660 to rotate the DC motor 190 and awaits at function 661 until the rotatable head 620 is rotated to the next angular position. If rotation is completed, then the CPU returns to repeat function 652.

Referring to the automatic pattern selection functions 663–674 shown in the flowchart of FIG. 37, the CPU 634 may be programmed such that an aerated anti-splash spray pattern is selected when a long distance is sensed, a non-restricted flow pattern is addressed when a mid range distance is detected, a non-aerated normal spray pattern is used when a short distance is sensed, and the valve 616 is closed if no object is sensed within a predetermined range. In this regard, the distance may be defined, for example, as being short if it is less than 100 mm ($L_{MIN}$), middle for a range between 100 mm and 250 mm ($L_{MID}$), long for a range between 250 mm and 400 mm ($L_{MAX}$). The CPU 634 determines at function 663 whether the distance Ld detected by the distance sensor 626 is greater than the higher limit $L_{MAX}$. If so, the valve 616 is checked at function 664 and is closed at function 665 if it is open. In this manner, the valve 616 is automatically closed if no object is sensed within the maximum range. If the detected distance Ld is equal to or less than $L_{MAX}$, then at function 666 it is determined if Ld is greater than $L_{MID}$. If it is, meaning that the object is in the long distance range, then the CPU checks the output of the position sensor 638 at function 667 to see whether the present water delivery pattern is aerated. If other pattern is addressed, the solenoid valve 616 is closed at function 668 and the motor 190 is activated at function 669. These functions are cyclically repeated until the rotatable head 620 is rotated to the aerated spray position. If at function 666 it is determined that the detected distance Ld is less than $L_{MID}$, then function 670 checks if Ld is greater than $L_{MIN}$. If it is greater, indicating that the object in the mid range, then at function 671 the present position of the rotatable head is checked and, if the position is not for the non-restricted flow, the valve 616 is closed at 668 and the motor is rotated at 669. As a result, the rotatable head will be rotated until the water discharge head adapted to the non-restricted flow is selected. If the determination at 670 is negative, then at function 672 the CPU 634 determines if Ld is equal to or less than $L_{MIN}$. If it is, meaning the the object is in a short distance range, then the valve 616 is closed at 668 and the motor is rotated at 669 unless at function 673 it is determined that the current position is for the normal spray pattern. In this manner, in the automatic control mode, the rotatable water delivery head is automatically rotated and the water delivery pattern changed over according to the position of the object.

While the present invention has been described herein with reference to the specific embodiments thereof, it is contemplated that the present invention is not limited thereby and various changes and modification may be made therein for those skilled in the art without departing from the scope of the invention. For example, as a mean for detecting the environmental condition of the shower unit, a conventional electrostatic capacitive sensor may be used to detect the fact that the shower unit is held in the hand of the user. Then, the rotatable shower head may be automatically rotated to deliver water in the form of a normal spray.

We claim:

1. A shower unit comprising:

a tubular casing having a proximal end and a distal end and having a water conduit extending therethrough, said proximal end of the casing being adapted to be connected to a water supply for admitting water under pressure into said conduit, said distal end of said casing defining a planar end face perpendicular to the longitudinal axis of said casing, said conduit being radially offset with respect to the longitudinal axis of the casing for at least a length thereof to provide in said casing a radially central cavity contiguous to said distal end, said conduit terminating in a water outlet port which opens onto said planar end face and is radially offset from the longitudinal axis of the casing;

a rotatable shower head supported with respect to said casing at a side of said distal end opposite said central cavity for rotation about said longitudinal axis of said casing, said shower head having a planar end face in flush with and rotatably engaging with said planar end face of said casing, said shower head having a plurality of different spray heads angularly equally spaced apart from each other and having different spray characteristics, each of said spray heads having a water inlet which opens onto said end face of said shower head and a radially outwardly directed spray outlet in fluid communication with said water inlet, said water inlet being radially offset from the longitudinal axis of said casing by a distance equal to the distance of offset of said water outlet port;

an electric drive housed in said central cavity of said casing and having an output drivingly coupled to said rotatable shower head to rotate it when activated;

means for supplying electric power to said electric drive; and, control means for activating said electric drive to rotate said shower head so that one of said water inlets is selectively aligned with said water outlet port whereby water under pressure admitted into said conduit is delivered through selected one of said spray heads.

2. A shower unit according to claim 1, wherein said unit further comprises a pressure sensor operative to detect water pressure in said water conduit and to issue a signal indicative of detected pressure and wherein said control means is responsive to said signal from said pressure sensor and activates said electric drive only when water pressure in said conduit is less than a predetermined value.

3. A method of using a shower unit as defined in claim 1, comprising the steps of:

aligning selected water inlet of said rotatable shower head with said water outlet port of said casing;

admitting water under pressure to said water conduit to deliver water spray through selected one of said spray heads;

reducing pressure of water admitted to said water conduit;

causing said control means to activate said electric drive so that said rotatable shower head is rotated through an angle to align water inlet of next spray head with said water outlet port; and, resuming pressure of water to deliver water spray through said next spray head.

4. A method according to claim 3, wherein said step of reducing of water pressure is carried out by draining water supply.

5. A method of using a shower unit as defined in claim 1, comprising the steps of:

aligning selected water inlet of said rotatable shower head with said water outlet port of said casing;

admitting water under pressure to said water conduit to deliver spray of water through selected one of said spray heads;

interrupting supply of water to said water conduit;

causing said control means to activate said electric drive so that said rotatable shower head is rotated through an angle to align water inlet of next spray head with said water outlet port; and, resuming water supply to deliver spray of water through said next spray head.

6. A shower unit according to claim 1, further comprising detection means responsive to an environmental condition in which said shower unit is placed in use for detecting desired spray characteristics for said condition, said control means being responsive to said detection means and operative to cause said rotatable shower head to rotate such that a spray head adapted to the desired spray characteristics is selectively communicated with said water outlet port of the casing.

7. A shower unit according to claim 6, wherein said detection means comprises means for measuring distance between said shower head and the user.

8. A shower unit according to claim 7, wherein said control means operates to rotate said shower head such that a spray head adapted to deliver an aerated anti-splash spray is selected when a relatively short distance is sensed.

9. A shower unit according to claim 7, wherein said control means operates to rotate said shower head such that a spray head adapted to deliver a diverging spray is selected when a medium distance is sensed.

10. A shower unit according to claim 7, wherein said control means operates to rotate said shower head such that a spray head adapted to deliver a non-restricted flow is selected when a relatively long distance is sensed.

11. A shower unit according to claim 6, wherein said shower unit comprises a hand-held shower unit and wherein said detection means detects said desired spray characteristics by cooperating with shower hangers arranged, respectively, in different locations.

12. A shower unit according to claim 11, wherein said detection means comprises a plurality of magnetically operable switches arranged on said handle casing in different positions, said magnetically operable switches being adapted to be selectively actuated by permanent magnets arranged on different shower hangers.

13. A shower unit according claim 1, wherein said water conduit has a cross-section, as viewed perpendicular to said longitudinal axis of said casing, which extends circumferentially of said casing through an angle.

14. A water supply system having a shower unit as defined in claim 1, wherein, for supplying water to a bath tub in one mode and providing shower in another mode, said system further comprises a flow control unit connectable to a source of water under pressure and a flexible hose connecting said control unit and said shower unit, and wherein said rotatable shower head comprises a first spray head adapted to deliver a non-restricted flow of water at a higher flow rate in said one mode and a second spray head adapted to spray water in said another mode.

15. A water supply system according to claim 14, wherein said flow control unit is adapted to supply a measured quantity of water to said shower unit in said one mode.

16. A shower unit comprising:

a tubular casing having a proximal end and a distal end and having a water conduit extending therethrough, said proximal end of the casing being adapted to be connected to a water supply for receiving water under pressure into said conduit, said distal end of said casing defining a planar end face perpendicular to the longitudinal axis of said casing, said conduit being radially offset with respect to the longitudinal axis of the casing for at least a length thereof to provide in said casing a central cavity contiguous to said distal end, said conduit terminating in a water outlet port which opens onto said planar end face and is radially offset from the longitudinal axis of the casing;

a rotatable shaft supported by said distal end of the casing for rotation about said longitudinal axis thereof, the ends of said shaft extending longitudinally on both sides of said end face;

a rotatable shower head mounted to an outer end of said shaft for rotation therewith about said longitudinal axis of the casing, said shower head having a planar end face in flush with and slidably engaging with said planar end face of said casing, said shower head having a plurality of different spray heads angularly spaced apart from each other and having different spray characteristics, each of said spray heads having a water inlet which opens onto said end face of said shower head and a radially outwardly directed spray outlet in fluid communication with said water inlet, said water inlet being radially offset from the longitudinal axis of said casing equally to said water outlet port;

an electric drive housed in said central cavity of said casing and drivingly coupled to an inner end of said shaft to rotate said shower head when activated;

means for supplying electric power to said electric drive; and, control means for activating said electric drive to rotate said shower head so that one of said water inlets is selectively aligned with said water outlet port whereby water under pressure entering into said conduit is delivered through selected one of said spray heads.

17. A shower unit according to claim 16, wherein said rotatable shower head is detachably fastened to said shaft to enable replacement with another shower head.

18. A shower unit according to claim 16, further comprising a cap affixed to said distal end of the casing and surrounding said rotatable shower head, said cap having a window in registration with said spray outlet of selected one of said spray heads.

19. A shower unit according to claim 16, wherein said unit further comprises a pressure sensor operative to detect water pressure in said water conduit and to issue a signal indicative of detected pressure and wherein said control means is responsive to said signal from said pressure sensor and activates said electric drive only when water pressure in said conduit is less than a predetermined value.

20. A method of using a shower unit as defined in claim 16, comprising the steps of:

aligning selected water inlet of said rotatable shower head with said water outlet port of said casing;

admitting water under pressure to said water conduit to deliver water spray through selected one of said spray heads;

reducing pressure of water admitted to said water conduit;

causing said control means to activate said electric drive so that said rotatable shower head is rotated through an angle to align water inlet of next spray head with said water outlet port; and;

resuming pressure of water to deliver water spray through said next spray head.

21. A method of using a shower unit as defined in claim 16, comprising the steps of:

aligning selected water inlet of said rotatable shower head with said water outlet port of said casing;

admitting water under pressure to said water conduit to deliver spray of water through selected one of said spray heads;

interrupting supply of water to said water conduit;

causing said control means to activate said electric drive so that said rotatable shower head is rotated through an angle to align water inlet of next spray head with said water outlet port; and, resuming water supply to deliver spray of water through said next spray head.

22. A shower unit according to claim 16, further comprising detection means responsive to an environmental condition in which said shower unit is placed in use for detecting desired spray characteristics for said condition, said control means being responsive to said detection means and operative to cause said rotatable shower head to rotate such that a spray head adapted to the desired spray characteristics is selectively communicated with said water outlet port of the casing.

23. A shower unit according to claim 16, wherein said water conduit has a cross-section, as viewed perpendicular to said longitudinal axis of said casing, which extends circumferentially of said casing through an angle.

24. A water supply system having a shower unit as defined in claim 16, wherein, for supplying water to a bath tube in one mode and providing shower in another mode, said system further comprises a flow control unit connectable to a source of water under pressure and a flexible hose connecting said control unit and said shower unit, and wherein said rotatable shower head comprises a first spray head adapted to deliver a nonrestricted flow of water at a higher rate in said one mode and a second spray head adapted to spray water in said another mode.

25. A shower unit comprising:

a tubular casing having a proximal end and a distal end and having a water conduit extending therethrough, said proximal end of the casing being adapted to be connected to a water supply for admitting water under pressure into said conduit, said distal end of said casing defining a bore having an axis thereof parallel to the longitudinal axis of said casing, said water conduit terminating in said bore, said conduit being radially offset with respect to the longitudinal axis of the casing for at least a length thereof to provide in said casing a central cavity contiguous to said distal end;

a pressure-responsive movable sealing member fluid tightly and slidably received in said bore, said sealing member having an outer end face perpendicular to the axis of said casing, said sealing member having a through opening in fluid communication with said conduit and terminating in a water outlet port which opens onto said outer end face, said outlet port being radially offset from the longitudinal axis of the casing;

a rotatable shower head supported with respect to said casing at a side of said distal end opposite said central cavity for rotation about said longitudinal axis of said casing, said shower head having an inner planar end face perpendicular to the axis of the casing and facing said outer end face of said sealing member, said shower head having a plurality of different spray heads angularly equally spaced apart from each other and having different spray characteristics, each of said spray heads having a water inlet which opens onto said inner end face of said shower head and a radially outwardly directed spray outlet in fluid communication with said water inlet, said water inlet being radially offset from the longitudinal axis of said casing by a distance equal to the distance of offset of said water outlet port of said sealing member;

an electric drive, including a micromotor, housed in said central cavity of said casing and drivingly coupled to said rotatable shower head to rotate it when activated;

means for supplying electric a power to said micromotor; and, control means for activating said electric drive to rotate said shower head so that one of said water inlets is selectively aligned with said water outlet port;

said sealing member having in said bore a pressure receptive area larger than the cross-sectional area of said outlet port so that an outwardly directed differential pressure is developed across said sealing member as water under pressure is admitted in said water conduit;

said outer end face of said sealing member being substantially disengaged in the absence of water pressure in said water conduit from said inner end face of said rotatable shower head to substantially eliminate frictional contact therebetween thereby to reduce torque required for said micromotor to rotate said shower head;

said sealing member being biased toward said rotatable shower head in response to water pressure in said conduit to urge said outer end face thereof against said inner end face of the rotatable shower head thereby to establish a fluid tight seal therebetween.

26. A shower bath system having a shower unit as defined in claim 25, wherein said system further comprises:

a flow control unit located upstream of said shower unit and having a water passage therethrough connectable to said water supply, said flow control unit further including an electrically operated first flow control valve for controlling flow of water through said water passage, means for supplying electric power to said control valve, and an electronic control circuit for controlling said flow control valve; and, a flexible hose connected between said flow control unit and said shower unit for supplying water under pressure to said water conduit in said shower unit when said flow control valve is opened.

27. A shower bath system according to claim 26, wherein said electronic control circuit of said flow control unit cooperate with said control means of said shower unit to control said flow control valve so that flow rate therethrough is reduced when said rotatable shower head is to be rotated thereby to decrease water pressure applied from said water conduit to said movable sealing member.

28. A shower bath system according to claim 27, wherein said shower unit further comprises a pressure sensor associated with said water conduit in said handle casing and operative to detect water pressure therein to issue a signal indicative of detected pressure, said control means of said shower unit being responsive to said signal from said pressure sensor and operative to cause said electric drive to be activated only when water pressure in said water conduit is less than a predetermined value.

29. A shower bath system according to claim 27, wherein said flow control unit further comprises a drain passage branching from said water passage and an electrically operated second flow control valve for controlling flow of water through said drain passage, said electronic control circuit of said flow control unit being operative to open said second flow control valve to reduce water pressure applied from said water conduit to said movable sealing member.

30. A shower bath system according to claim 26, wherein said control means of said shower unit and said electronic control circuit of said flow control unit comprise, respectively, a first and a second digital microcomputer, said microcomputers being connected to electronically communicate with each other via a data communication medium extending along said flexible hose.

31. A shower bath system according to claim 30, wherein said shower unit further comprises a pressure sensor associated with said water conduit in said handle casing and operative to detect water pressure therein to issue a signal indicative of detected pressure, and wherein one of said first and second microcomputers is operative to derive desired flow rate for the spray head selectively aligned with said water outlet port of said sealing member, to derive measured flow rate through said spray head in response to said signal from said pressure sensor, and to control said flow control valve such that said measured flow rate becomes equal to said desired flow rate.

32. A shower bath system according to claim 31, wherein said one of microcomputers is operative to derive said measured flow rate based on equation:

$$Q=KCv\sqrt{P}$$

where Q is the measured flow rate through said spray head aligned with said water outlet port of said sealing member, K is a constant, Cv is a flow coefficient memorized in one of said first and second microcomputers as being unique to said spray head, and P is a gauge pressure detected by said pressure sensor.

33. A shower bath system according to claim 32, wherein said flow control unit further comprises a flowmeter associated with said water passage to detect flow rate of water flowing therethrough to deliver a signal indicative of detected flow rate, said one of microcomputers being responsive to said signal from said flowmeter to renew the memorized value for said flow coefficient Cv in such a manner that said measured flow rate becomes equal to said flow rate detected by sad flowmeter.

34. A shower bath system according to claim 31, further comprising alarm means responsive to water pressure detected by said pressure sensor for indicating an abnormally high water pressure condition of the system.

35. A shower bath system according to claim 30, further comprising a hose coupling for connecting an end of said flexible hose to said proximal end of the handle casing, said hose coupling being attached to said proximal end for limited rotational movement with respect thereto, said data communication medium including a pair of electric wires extending around said flexible hose, said electric wires extending across said hose coupling and entering into said central cavity of said handle casing along said longitudinal axis of said casing.

36. A shower unit according to claim 25, wherein said unit further comprises a pressure sensor operative to detect water pressure in said water conduit and to issue a signal indicative of detected pressure and wherein said control means is responsive to said signal from said pressure sensor and activates said electric drive only when water pressure in said conduit is less than a predetermined value.

37. A method of using a shower unit as defined in claim 25, comprising the steps of:

aligning selected water inlet of said rotatable shower head with said water outlet port of said casing;

admitting water under pressure to said water conduit to deliver water spray through selected one of said spray heads;

reducing pressure of water admitted to said water conduit;

causing said control means to activate said electric drive so that said rotatable shower head is rotated through an angle to align water inlet of next spray head with said water outlet port; and;

resuming pressure of water to deliver water spray through said next spray head.

38. A method of using a shower unit as defined in claim 25, comprising the steps of:

aligning selected water inlet of said rotatable shower head with said water outlet port of said casing;

admitting water under pressure to said water conduit to deliver spray of water through selected one of said spray heads;

interrupting supply of water to said water conduit;

causing said control means to activate said electric drive so that said rotatable shower head is rotated through an angle to align water inlet of next spray head with said water outlet port; and, resuming water supply to deliver spray of water through said next spray head.

39. A shower unit according to claim 25, further comprising detection means responsive to an environmental condition in which said shower unit is placed in use for detecting desired spray characteristics for said condition, said control means being responsive to said detection means and operative to cause said rotatable shower head to rotate such that a spray head adapted to the desired spray characteristics is selectively communicated with said water outlet port of the casing.

40. A shower unit according to claim 25, wherein said water conduit has a cross-section, as viewed perpendicular to said longitudinal axis of said casing, which extends circumferentially of said casing through an angle.

41. A water supply system having a shower unit as defined in claim 25, wherein, for supplying water to a bath tub in one mode and providing shower in another mode, said system further comprises a flow control unit connectable to a source of water under pressure and a flexible hose connecting said control unit and said shower unit, and wherein said rotatable shower head comprises a first spray head adapted to deliver a non-restricted flow of water at a high rate in said one mode and a second spray head adapted to spray water in said another mode.

42. A shower unit comprising:

a tubular casing having a proximal end and a distal end and having a water conduit extending therethrough, said proximal end of the casing being adapted to be connected to a water supply for admitting water under pressure into said conduit, said distal end of said casing defining an outwardly open bore having an axis thereof parallel to the longitudinal axis of said casing, said bore being in fluid communication with said water conduit, said conduit being radially offset with respect to the longitudinal axis of the casing for at least a length thereof to provide in said casing a central cavity contiguous to said distal end;

a pressure-responsive movable sealing member fluid tightly and slidably received in said bore, said sealing member having an axial bore therethrough and having an outer end face perpendicular to the axis of said casing, said sealing member having a through opening in fluid communication with said conduit and terminating in a water outlet port which opens onto said outer end face and which is radially offset from the longitudinal axis of the casing;

a rotatable shaft extending through said axial bore of said movable sealing member and supported by said casing for rotation about the longitudinal axis of said casing;

a rotatable shower head mounted to an outer end of said shaft for rotation therewith about said longitudinal axis of the casing, said shower head having an inner planar end face perpendicular to the axis of the casing and facing said outer end face of said sealing member, said shower head having a plurality of different spray heads angularly equally spaced apart from each other and having different spray characteristics, each of said spray heads having a water inlet which opens onto said inner end face of said shower head and a radially outwardly directed spray outlet in fluid communication with said water inlet, said water inlet being radially offset from the longitudinal axis of said casing by a distance equal to the distance of offset of said water outlet port of said sealing member;

an electric drive, including a micromotor, housed in said central cavity of said casing and having an output drivingly coupled to said shaft to rotate said rotatable shower head when activated;

means for supplying electric power to said micromotor; and, control means mounted on said casing for activating said electric drive to rotate said shower head so that one of said water inlets of said shower head is selectively aligned with said water outlet port of said sealing member;

said sealing member having in said bore of said casing a pressure receptive area larger than the cross-sectional area of said outlet port so that an outwardly directed differential pressure is developed across said sealing member as water under pressure is admitted into said water conduit;

said outer end face of said sealing member being in loose contact with said inner end face of said rotatable shower head in the absence of water pressure in said water conduit;

said sealing member being biased toward said rotatable shower head tin the presence of water pressure in said conduit to urge said outer end face thereof against said inner end face of the rotatable shower head thereby to establish a fluid tight seal therebetween.

43. A shower unit according to claim 42, wherein said rotatable shower head, said rotatable shaft, said axial bore of said sealing member and said electric drive are axially aligned.

44. A shower unit according to claim 43, wherein said electric drive is suspended from said shaft.

causing said control means to activate said electric drive so that said rotatable shower head is rotated through an angle to align water inlet of next spray head with said water outlet port; and, resuming water supply to deliver spray of water through said next spray head.

45. A shower unit according to claim 42, wherein said electric drive comprises a geared micromotor.

46. A shower unit according to claim 42, wherein said unit further comprises an angular position sensor associated with said shaft for detecting rotational position of said shower head and wherein said control means cooperates with said position sensor to selectively align one of said water inlets of said rotatable shower head with said water outlet port of said sealing member.

47. A shower unit according to claim 42, wherein said unit further comprises a pressure sensor operative to detect water pressure in said water conduit and to issue a signal indicative of detected pressure and wherein said control means is responsive to said signal from said pressure sensor and activates said electric drive only when water pressure in said conduit is less than a predetermined value.

48. A method of using a shower unit as defined in claim 42, comprising the steps of:

aligning selected water inlet of said rotatable shower head with said water outlet port of said casing;

admitting water under pressure to said water conduit to deliver water spray through selected one of said spray heads;

reducing pressure of water admitted to said water conduit;

causing said control means to activate said electric drive so that said rotatable shower head is rotated through an angle to align water inlet of next spray head with said water outlet port; and;

resuming pressure of water to deliver water spray through said next spray head.

49. A method of using a shower unit as defined in claim 42, comprising the steps of:

aligning selected water inlet of said rotatable shower head with said water outlet port of said casing;

admitting water under pressure to said water conduit to deliver spray of water through selected one of said spray heads;

interrupting supply of water to said water conduit;

causing said control means to activate said electric drive so that said rotatable shower head is rotated through an angle to align water inlet of next spray head with said water outlet port; and, resuming water supply to deliver spray of water through said next spray head.

50. A shower unit according to claim 42, further comprising detection means responsive to an environmental condition in which said shower unit is placed in use for detecting desired spray characteristics for said condition, said control means being responsive to said detection means and operative to cause said rotatable shower head to rotate such that a spray head adapted to the desired spray characteristics is selectively communicated with said water outlet port of the casing.

51. A shower unit according to claim 42, wherein said water conduit has a cross-section, as viewed perpendicular to said longitudinal axis of said casing, which extends circumferentially of said casing through an angle.

52. A shower bath system having a shower unit as defined in claim 42, wherein said system further comprises:

a flow control unit located upstream of said shower unit and having a water passage therethrough connectable to said water supply, said flow control unit further including an electrically operated first flow control valve for controlling flow of water through said water passage, means for supplying electric power to said control valve, sand an electronic control circuit for controlling said flow control valve; and a flexible hose connected between said flow control unit and said shower unit for supplying water under pressure to said water conduit in said shower unit when said flow control valve is opened.

53. A water supply system having a shower unit as defined in claim 42, wherein, for supplying water to a bath tub in one mode and providing shower in another mode, said system further comprises a flow control unit connectable to a source of water under pressure and a flexible hose connecting said control unit and said shower unit, and wherein said rotatable shower head comprises a first spray head adapted to deliver a non-restricted flow of water at a higher rate in said one mode and a second spray head adapted to spray water in said another mode.

54. An adaptive faucet spout with a revolving water delivery head comprising:

a tubular casing having a first end and a second end and having a water conduit extending therethrough, said first end of the casing being adapted to be connected to a faucet body for admitting water under pressure into said conduit, said second end of said casing defining a planar end face perpendicular to the longitudinal axis of said casing, said conduit being radially offset with respect to the longitudinal axis of the casing for at least a length thereof to provide in said casing a radially central cavity contiguous to said second end, said conduit terminating in a water outlet port which opens onto said planar end face and is radially offset from the longitudinal axis of the casing;

a rotatable water delivery head supported with respect to said casing at a side of said second end opposite said central cavity for rotation about said longitudinal axis of said casing, said delivery head having a planar end face in flush with and rotatably engaging with said planar end face of said casing, said delivery head having a plurality of different discharge heads angularly equally spaced apart from each other and having different water delivery characteristics, each of said discharge heads having a water inlet which opens onto said end face of said shower head and a radially outwardly directed discharge outlet in fluid communication with said water inlet, said water inlet being radially offset from the longitudinal axis of said casing by a distance equal to the distance of offset of said water outlet port;

an electric drive housed in said central cavity of said casing and having an output drivingly coupled to said rotatable delivery head to rotate it when activated;

means for supplying electric power to said electric drive; and, control means for activating said electric drive to rotate said delivery head so that one of said water inlets is selectively aligned with said water outlet port whereby water under pressure admitted into said conduit is delivered through selected one of said discharge heads.

55. An adaptive faucet spout with a revolving water delivery head comprising:

a tubular casing having a first end and a second end and having a water conduit extending therethrough, said first end of the casing being adapted to be connected to a faucet body for receiving water under pressure into said conduit, said second end of said casing defining a planar end face perpendicular to the longitudinal axis of said casing, said conduit being radially offset with respect to the longitudinal axis of the casing for at least a length thereof to provide in said casing a central cavity contiguous to said second end, said conduit terminating in a water outlet port which opens onto said planar end face and is radially offset from the longitudinal axis of the casing;

a rotatable shaft supported by said second end of the casing for rotation about said longitudinal axis thereof, the ends of said shaft extending longitudinally on both sides of said end face;

a rotatable water delivery head mounted to an outer end of said shaft for rotation therewith about said longitudinal axis of the casing, said delivery head having a planar end face in flush with and slidably engaging with said planar end face of said casing, said delivery head having a plurality of different discharge heads angularly spaced apart from each other and having different water delivery characteristics, each of said discharge heads having a water inlet which opens onto said end face of said delivery head and a radially outwardly directed discharge outlet in fluid communication with said water inlet, said water inlet being radially offset from the longitudinal axis of said casing equally to said water outlet port;

an electric drive housed in said central cavity of said casing and drivingly coupled to an inner end of said shaft to rotate said delivery head when activated;

means for supplying electric power to said electric drive; and, control means for activating said electric drive to rotate said delivery head so that one of said water inlets is selectively aligned with said water outlet port whereby water under pressure entering into said conduit is delivered through selected one of said discharge heads.

56. A faucet spout according to claim 55, wherein, for automatic positioning of said discharge heads, said faucet spout further comprises detection means for sensing and measuring distance between said delivery head and an object, said control means being responsive to said detection means and operative to cause said rotatable delivery head to rotate such that a discharge head having water delivery characteristics adapted to the distance between the delivery head and the object is selectively communicated with said faucet body.

57. A faucet with a revolving water delivery head comprising:

a faucet body with an electrically operated water control valve;

a tubular casing having a first end and a second end and having a water conduit extending therethrough, said first end of the casing being connected to said faucet body for admitting water under pressure into said conduit, said second end of said casing defining an outwardly open bore having an axis thereof parallel to the longitudinal axis of said casing, said bore being in fluid communication with said water conduit, said conduit being radially offset with respect to the longitudinal axis of the casing for at least a length thereof to provide in said casing a central cavity contiguous to said second end;

a pressure-responsive movable sealing member fluid tightly and slidably received in said bore, said sealing member having an axial bore therethrough and having an outer end face perpendicular to the axis of said casing, said sealing member having a through opening in fluid communication with said conduit and terminating in a water outlet port which opens onto said outer end face and which is radially offset from the longitudinal axis of the casing;

a rotatable shaft extending through said axial bore of said movable sealing member and supported by said casing for rotation about the longitudinal axis of said casing;

a rotatable water delivery head mounted to an outer end of said shaft for rotation therewith about said longitudinal axis of the casing, said delivery head having an inner planar end face perpendicular to the axis of the casing and facing said outer end face of said sealing member, said delivery head having a plurality of different water discharge heads angularly equally spaces apart from each other and having different water delivery characteristics, each of said delivery heads having a water inlet which opens onto said inner end face of said delivery head and a radially outwardly directed water discharge outlet in fluid communication with said water inlet, said water inlet being radially offset from the longitudinal axis of said casing by a distance equal to the distance of offset of said water outlet port of said sealing member;

an electric drive, including a micromotor, housed in said central cavity of said casing and having an output drivingly coupled to said shaft to rotate said rotatable delivery head when activated;

means for supplying electric power to said water control valve and said micromotor;.and, control means for controlling said water control valve and said electric drive, said control means being operative to close said water control valve when said rotatable water delivery head is to be rotated; said control means being thereafter operative to activate said electric drive to rotate said delivery head so that one of said water inlets of said delivery head is selectively aligned with said water outlet port of said sealing member;

said sealing member having in said bore of said casing a pressure receptive area larger than the cross-sectional area of said outlet port so that an outwardly directed differential pressure is developed across said sealing member as water under pressure is admitted through said water control valve into said water conduit;

said outer end face of said sealing member being in loose contact with said inner end face of said rotatable delivery head when said water control valve is closed so that water pressure is absent in said water conduit;

said sealing member being biased toward said rotatable delivery head to urge said outer end face thereof against said inner end face of the rotatable delivery head thereby to establish a fluid tight seal therebetween when said water control valve is opened to apply water pressure in said conduit.

58. A faucet according to claim 57, wherein, for automatic switching of said discharge heads, said faucet further comprises detection means for detecting at least one property of an object, said control means cooperating with said detection means and being operative to cause said rotatable water delivery head to rotate such that a water discharge head adapted to the detected property of the object is selectively communicated with said water outlet port of the casing.

59. A faucet according to claim 58, wherein said detection means comprises means for measuring distance between said water delivery head and the object.

60. A faucet according to claim 59, wherein said control means operates to rotate said water delivery head such that a water discharge head adapted to deliver an aerated anti-splash flow of water is selected when a relatively long distance is sensed.

61. A faucet according to claim 59, wherein said control means operates to rotate said water delivery head such that a water discharge head adapted to deliver a non-restricted flow of water is selected when a medium distance is sensed.

62. A faucet according to claim 59, wherein said control means operates to rotate said water delivery head such that a water discharge head adapted to deliver a spray of water is selected when a relatively short distance is sensed.

63. A faucet according to claim 57, wherein said means for supplying electric power comprises a battery housed in said casing so that said micromotor is battery operated.

* * * * *